US012089028B2

(12) United States Patent
Pihlajakuja et al.

(10) Patent No.: US 12,089,028 B2
(45) Date of Patent: Sep. 10, 2024

(54) PRESENTATION OF PREMIXED CONTENT IN 6 DEGREE OF FREEDOM SCENES

(71) Applicant: Nokia Technologies Oy, Espoo (FI)

(72) Inventors: Tapani Pihlajakuja, Vantaa (FI); Lasse Laaksonen, Tampere (FI); Arto Lehtiniemi, Lempaala (FI); Antti Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 197 days.

(21) Appl. No.: 17/760,589

(22) PCT Filed: Sep. 17, 2020

(86) PCT No.: PCT/FI2020/050595

§ 371 (c)(1),
(2) Date: Mar. 15, 2022

(87) PCT Pub. No.: WO2021/058857

PCT Pub. Date: Apr. 1, 2021

(65) Prior Publication Data

US 2022/0353630 A1 Nov. 3, 2022

(30) Foreign Application Priority Data

Sep. 25, 2019 (GB) ...................................... 1913820

(51) Int. Cl.
*H04S 7/00* (2006.01)
*H04R 5/02* (2006.01)
(Continued)

(52) U.S. Cl.
CPC ............... *H04S 7/303* (2013.01); *H04R 5/02* (2013.01); *H04S 3/008* (2013.01); *H04S 2400/01* (2013.01); *H04S 2400/11* (2013.01)

(58) Field of Classification Search
None
See application file for complete search history.

(56) References Cited

U.S. PATENT DOCUMENTS 10,375,505 B2 * 8/2019 Fontana .................. H04R 3/04
2012/0014525 A1 * 1/2012 Ko ........................... H04S 7/40
381/17

(Continued)

FOREIGN PATENT DOCUMENTS

CN 104041079 A 9/2014
CN 105874821 A 8/2016

(Continued)

*Primary Examiner* — Qin Zhu
(74) *Attorney, Agent, or Firm* — Harrington & Smith

(57) ABSTRACT

A method including: obtaining at least two audio signals for reproduction, each of the at least two audio signals associated with a respective one of at least two reproduction locations within an audio reproduction space; obtaining within the audio reproduction space at least two zones; obtaining at least one location for a user's position within the audio reproduction space, the at least one location being relative to at least one of the at least two zones and the at least two reproduction locations; and processing the at least two audio signals based on the obtained at least one location for the user's position within the audio reproduction space to generate at least one output audio signal, the at least one output audio signal is reproduced from at least one of the at least two reproduction locations.

21 Claims, 14 Drawing Sheets

(51) Int. Cl.

| | |
|---|---|
| ***H04S 3/00*** | (2006.01) |
| ***H04S 3/02*** | (2006.01) |

(56) References Cited

U.S. PATENT DOCUMENTS

| | | | | |
|---|---|---|---|---|
| 2013/0230175 | A1* | 9/2013 | Bech | H04R 5/04 381/17 |
| 2015/0358756 | A1 | 12/2015 | Harma et al. | 7/302 |
| 2016/0036987 | A1* | 2/2016 | Cartwright | H04M 3/568 381/17 |
| 2017/0026750 | A1* | 1/2017 | Mansfield | H04R 3/14 |
| 2017/0242651 | A1* | 8/2017 | Lang | H04R 27/00 |
| 2017/0359672 | A1 | 12/2017 | Lyren et al. | 7/304 |
| 2018/0332421 | A1* | 11/2018 | Torres | H04S 3/008 |
| 2019/0335290 | A1* | 10/2019 | Laaksonen | G02B 27/017 |
| 2020/0142667 | A1* | 5/2020 | Querze | G06F 3/165 |
| 2020/0280815 | A1* | 9/2020 | Suenaga | H04S 3/002 |
| 2022/0248139 | A1* | 8/2022 | Yore | H04R 29/001 |

FOREIGN PATENT DOCUMENTS

| | | | |
|---|---|---|---|
| CN | 106797525 | A | 5/2017 |
| CN | 107426666 | A | 12/2017 |
| CN | 108370471 | A | 8/2018 |
| EP | 2 663 099 | A1 | 11/2013 |
| GB | 2575511 | A | 1/2020 |

* cited by examiner

PRESENTATION OF PREMIXED CONTENT IN 6 DEGREE OF FREEDOM SCENES

CROSS REFERENCE TO RELATED APPLICATION

This patent application is a U.S. National Stage application of International Patent Application Number PCT/FI2020/050595 filed Sep. 17, 2020 which is hereby incorporated by reference in its entirety, and claims priority to GB 1913820.5 filed Sep. 25, 2019.

FIELD

The present application relates to apparatus and methods for presentation of premixed content in 6 degree of freedom scenes.

BACKGROUND

The capture or recording of spatial sound using microphone arrays, such as the ones in consumer mobile devices (such as the Nokia 8) and commercial recording devices (such as the Nokia OZO) is known. This spatial sound may be reproduced for headphones or multichannel loudspeaker setups and provide a rich audio experience. The audio signals captured by the devices may be reproduced in a suitable output format within the same device, or at another device. For example, after transmission as audio channels and spatial metadata or as Ambisonic signals to a suitable playback or receiver device.

For transmission, the audio signals or channels can be compressed, for example, using advanced audio coding (AAC) or MPEG-H 3D audio compression or other suitable compression mechanism. The spatial metadata can also be compressed and either transmitted in the same data packet as the audio data or as a separate compressed metadata stream. In the case where the audio signals or channels and the associated metadata are compressed for transmission, they are decoded before reproduction.

Mobile devices which may comprise microphone arrays, may utilize parametric spatial audio capture and rendering methods to enable perceptually accurate spatial sound reproduction. Parametric spatial audio capture refers to adaptive DSP-driven audio capture methods. Specifically, parametric spatial audio methods can be typically summarized as the following operations:

1) analysing perceptually relevant parameters in frequency bands and in short temporal intervals (often referred as time-frequency slots), for example, the direction-of-arrival of the propagating sound at the recording position, and 2) reproducing spatial sound in a perceptual sense at the rendering side according to the estimated spatial parameters.

The reproduction can be, for example, for headphones or multichannel loudspeaker setups. By estimating and reproducing the perceptually relevant spatial properties (parameters) of the sound field, a spatial perception similar to that which would occur if the listener was listening to the original sound field can be produced. As a result, a listener can perceive the multitude of sources, their directions and distances, as well as properties of the surrounding physical space, among the other spatial sound features, as if the listener was in the position of the capture device.

Reproduction can involve, for example, a MPEG-I Audio Phase 2 (6DoF) rendering where methods are implemented for parameterizing and rendering audio scenes comprising audio elements as objects, channels, and higher-order ambisonics (HOA), and scene information containing geometry, dimensions, and materials of the scene. In addition, there can be various types of metadata which indicate or convey an "artistic intent", that is, how the rendering should be controlled and/or modified as the user moves in the scene.

MPEG-I Immersive Audio standard (MPEG-I Audio Phase 2 6DoF) supports audio rendering for virtual reality (VR) and augmented reality (AR) applications. The standard is based on MPEG-H 3D Audio, which supports 3DoF rendering of object, channel, and HOA content. In 3DoF rendering, the listener is able to listen to the audio scene at a single location while rotating their head in three dimensions (yaw, pitch, roll) and the rendering stays consistent to the user head rotation. That is, the audio scene does not rotate along with the user head but stays fixed as the user rotates their head.

The additional degrees of freedom in 6DoF audio rendering enable the listener to move in the audio scene along the three cartesian dimensions x, y, and z. MPEG-I aims to enable this by using MPEG-H 3D Audio as the audio signal transport format while defining new metadata and rendering technology to facilitate 6DoF rendering.

SUMMARY

There is provided according to a first aspect an apparatus comprising means configured to: obtain at least two audio signals for reproduction, each of the at least two audio signals associated with a respective one of at least two reproduction locations within an audio reproduction space; obtain within the audio reproduction space at least two zones; obtain at least one location for a user's position within the audio reproduction space, the at least one location being relative to at least one of the at least two zones and the at least two reproduction locations; process the at least two audio signals based on the obtained at least one location for the user's position within the audio reproduction space to generate at least one output audio signal, the at least one output audio signal is reproduced from at least one of the at least two reproduction locations.

The means may be further configured to output the at least one output audio signal to at least one output device at the at least one of the at least two reproduction locations.

The at least one output device may comprise: a loudspeaker, wherein the output audio signal is a loudspeaker channel audio signal; a virtual loudspeaker, wherein the output audio signal is a rendered virtual loudspeaker channel audio signal.

The means configured to obtain at least two audio signals may be configured to perform at least one of: obtain premixed channel-based audio signal content for playback through at least two loudspeakers; obtain ambisonic audio signals pre-rendered for playback through at least two loudspeakers; obtain a metadata-assisted spatial audio signal pre-rendered for playback through at least two loudspeakers; and obtain audio object audio signals.

The means configured to obtain within the audio reproduction space at least two zones may be configured to perform at least one of: receive metadata associated with the at least two audio signals, the metadata configured to define regions or volumes of the at least two zones within the audio reproduction space; receive metadata associated with the at least two audio signals, the metadata configured to define the reproduction locations within the audio reproduction space, wherein regions or volumes of the at least two zones are defined based on the reproduction locations; and receive metadata associated with the space, the metadata configured to define the perimeter of the audio reproduction space, wherein regions or volumes of the at least two zones are defined based on the perimeter of the audio reproduction space.

The at least two zones may comprise: a first, inner, zone; a second, intermediate, zone extending from the first zone; and a third, outer, zone extending from the second zone.

The means configured to receive metadata associated with the at least two audio signals, the metadata configured to define the reproduction locations, wherein regions or volumes of the at least two zones are defined based on the reproduction locations may be configured to: define the first, inner, zone based on a mean location of the reproduction locations and a radius defined by a product of a first zone distance adjustment parameter and a distance between a reproduction location of a channel nearest to the mean location and the mean location; and define the second, intermediate, zone extending from the first zone, the second zone extending to a further radius defined by a product of a second zone distance adjustment parameter and a distance between a reproduction location of a channel farthest from the mean location and the mean location; and define the third, outer, zone extending from the second zone.

The means configured to process the at least two audio signals may be configured to pass the at least one of the at least two audio signals unmodified when the at least one location is within the first zone.

The means configured to process the at least two audio signals may be configured to transfer at least part of an audio signal associated with one or more reproduction locations to one or more further audio signals associated with one or more further reproduction locations, wherein the one or more reproduction locations may be one of: one or more reproduction location furthest from the at least one location or one or more reproduction location nearest the at least one location and the one or more further reproduction location may be respectively one of: one or more reproduction location nearest the at least one location or one or more reproduction location furthest from the at least one location, when the at least one location is within the second zone.

At least part of an audio signal associated with one or more reproduction locations may be based on the distances between the at least one location and a nearest boundary between the first and second zones and a nearest boundary between the second and third zones.

The means configured to process the at least two audio signals may be configured to transfer at least part of an audio signal associated with one or more reproduction locations to at least one audio signal associated with one of more further reproduction locations, wherein the one or more reproduction locations is one of: one or more reproduction locations furthest from the at least one location or one or more reproduction locations nearest the at least one location and the one or more further reproduction location is respectively one of: one or more reproduction location nearest the at least one location or one or more reproduction location furthest from the at least one location, when the at least one location is within the second zone and furthermore distance attenuated when the at least one location is within the third zone.

The at least two zones may comprise at least one proximity zone, the at least one proximity zone being located at one of the at least two reproduction locations and wherein the means configured to process the at least two audio signals may be configured to, when the at least one location is within one of the at least one proximity zone, transfer to an audio signal associated with the nearest reproduction location at least part of an audio signal associated with one or more reproduction location other than the nearest reproduction location.

The at least two zones may comprise at least one proximity zone, the at least one proximity zone may be located at one of the at least two reproduction locations and wherein the means configured to process the at least two audio signals may be configured to, when the at least one location is within one of the at least one proximity zone, transfer at least part of an audio signal associated with the nearest reproduction location to at least one or more audio signal associated with a reproduction location other than the nearest reproduction location.

The audio reproduction space may at least comprise one of: a virtual loudspeaker configuration; and a real loudspeaker configuration.

According to a second aspect there is provided a method comprising: obtaining at least two audio signals for reproduction, each of the at least two audio signals associated with a respective one of at least two reproduction locations within an audio reproduction space; obtaining within the audio reproduction space at least two zones; obtaining at least one location for a user's position within the audio reproduction space, the at least one location being relative to at least one of the at least two zones and the at least two reproduction locations; and processing the at least two audio signals based on the obtained at least one location for the user's position within the audio reproduction space to generate at least one output audio signal, the at least one output audio signal is reproduced from at least one of the at least two reproduction locations.

The method may further comprise outputting the at least one output audio signal to at least one output device at the at least one of the at least two reproduction locations.

The at least one output device may comprise: a loudspeaker, wherein the output audio signal is a loudspeaker channel audio signal; and a virtual loudspeaker, wherein the output audio signal is a rendered virtual loudspeaker channel audio signal.

Obtaining at least two audio signals may comprise performing at least one of: obtaining premixed channel-based audio signal content for playback through at least two loudspeakers; obtaining ambisonic audio signals pre-rendered for playback through at least two loudspeakers; obtaining a metadata-assisted spatial audio signal pre-rendered for playback through at least two loudspeakers; and obtaining audio object audio signals.

Obtaining within the audio reproduction space at least two zones may comprise performing at least one of: receiving metadata associated with the at least two audio signals, the metadata configured to define regions or volumes of the at least two zones within the audio reproduction space; receiving metadata associated with the at least two audio signals, the metadata configured to define the reproduction locations within the audio reproduction space, wherein regions or volumes of the at least two zones are defined based on the reproduction locations; and receiving metadata associated with the space, the metadata configured to define the perimeter of the audio reproduction space, wherein regions or volumes of the at least two zones are defined based on the perimeter of the audio reproduction space.

The at least two zones may comprise: a first, inner, zone; a second, intermediate, zone extending from the first zone; and a third, outer, zone extending from the second zone.

Receiving metadata associated with the at least two audio signals, the metadata configured to define the reproduction locations, wherein regions or volumes of the at least two zones are defined based on the reproduction locations may comprise: defining the first, inner, zone based on a mean location of the reproduction locations and a radius defined by a product of a first zone distance adjustment parameter and a distance between a reproduction location of a channel nearest to the mean location and the mean location; and defining the second, intermediate, zone extending from the first zone, the second zone extending to a further radius defined by a product of a second zone distance adjustment parameter and a distance between a reproduction location of a channel farthest from the mean location and the mean location; and defining the third, outer, zone extending from the second zone.

Processing the at least two audio signals may comprise passing the at least one of the at least two audio signals unmodified when the at least one location is within the first zone.

Processing the at least two audio signals may comprise transferring at least part of an audio signal associated with one or more reproduction locations to one or more further audio signals associated with one or more further reproduction locations, wherein the one or more reproduction locations is one of: one or more reproduction location furthest from the at least one location or one or more reproduction location nearest the at least one location and the one or more further reproduction location is respectively one of: one or more reproduction location nearest the at least one location or one or more reproduction location furthest from the at least one location, when the at least one location is within the second zone.

At least part of an audio signal associated with one or more reproduction locations may be based on the distances between the at least one location and a nearest boundary between the first and second zones and a nearest boundary between the second and third zones.

Processing the at least two audio signals may comprise transferring at least part of an audio signal associated with one or more reproduction locations to at least one audio signal associated with one of more further reproduction locations, wherein the one or more reproduction locations is one of: one or more reproduction locations furthest from the at least one location or one or more reproduction locations nearest the at least one location and the one or more further reproduction location is respectively one of: one or more reproduction location nearest the at least one location or one or more reproduction location furthest from the at least one location, when the at least one location is within the second zone and furthermore distance attenuated when the at least one location is within the third zone.

The at least two zones may comprise at least one proximity zone, the at least one proximity zone may be located at one of the at least two reproduction locations and wherein processing the at least two audio signals may comprise, when the at least one location is within one of the at least one proximity zone, transferring to an audio signal associated with the nearest reproduction location at least part of an audio signal associated with one or more reproduction location other than the nearest reproduction location.

The at least two zones may comprise at least one proximity zone, the at least one proximity zone may be located at one of the at least two reproduction locations and wherein processing the at least two audio signals may comprise, when the at least one location is within one of the at least one proximity zone, transferring at least part of an audio signal associated with the nearest reproduction location to at least one or more audio signal associated with a reproduction location other than the nearest reproduction location.

The audio reproduction space may at least comprise one of: a virtual loudspeaker configuration; and a real loudspeaker configuration.

According to a third aspect there is provided an apparatus comprising at least one processor and at least one memory including a computer program code, the at least one memory and the computer program code configured to, with the at least one processor, cause the apparatus at least to: obtain at least two audio signals for reproduction, each of the at least two audio signals associated with a respective one of at least two reproduction locations within an audio reproduction space; obtain within the audio reproduction space at least two zones; obtain at least one location for a user's position within the audio reproduction space, the at least one location being relative to at least one of the at least two zones and the at least two reproduction locations; process the at least two audio signals based on the obtained at least one location for the user's position within the audio reproduction space to generate at least one output audio signal, the at least one output audio signal is reproduced from at least one of the at least two reproduction locations.

The means may be further configured to output the at least one output audio signal to at least one output device at the at least one of the at least two reproduction locations.

The at least one output device may comprise: a loudspeaker, wherein the output audio signal is a loudspeaker channel audio signal; a virtual loudspeaker, wherein the output audio signal is a rendered virtual loudspeaker channel audio signal.

The apparatus caused to obtain at least two audio signals may be caused to perform at least one of: obtain premixed channel-based audio signal content for playback through at least two loudspeakers; obtain ambisonic audio signals pre-rendered for playback through at least two loudspeakers; obtain a metadata-assisted spatial audio signal pre-rendered for playback through at least two loudspeakers; and obtain audio object audio signals.

The apparatus caused to obtain within the audio reproduction space at least two zones may be caused to perform at least one of: receive metadata associated with the at least two audio signals, the metadata configured to define regions or volumes of the at least two zones within the audio reproduction space; receive metadata associated with the at least two audio signals, the metadata configured to define the reproduction locations within the audio reproduction space, wherein regions or volumes of the at least two zones are defined based on the reproduction locations; and receive metadata associated with the space, the metadata configured to define the perimeter of the audio reproduction space, wherein regions or volumes of the at least two zones are defined based on the perimeter of the audio reproduction space.

The at least two zones may comprise: a first, inner, zone; a second, intermediate, zone extending from the first zone; and a third, outer, zone extending from the second zone.

The apparatus caused to receive metadata associated with the at least two audio signals, the metadata configured to define the reproduction locations, wherein regions or volumes of the at least two zones are defined based on the reproduction locations may be caused to: define the first, inner, zone based on a mean location of the reproduction locations and a radius defined by a product of a first zone distance adjustment parameter and a distance between a reproduction location of a channel nearest to the mean location and the mean location; and define the second, intermediate, zone extending from the first zone, the second zone extending to a further radius defined by a product of a second zone distance adjustment parameter and a distance between a reproduction location of a channel farthest from the mean location and the mean location; and define the third, outer, zone extending from the second zone.

The apparatus caused to process the at least two audio signals may be caused to pass the at least one of the at least two audio signals unmodified when the at least one location is within the first zone.

The apparatus caused to process the at least two audio signals may be caused to transfer at least part of an audio signal associated with one or more reproduction locations to one or more further audio signals associated with one or more further reproduction locations, wherein the one or more reproduction locations may be one of: one or more reproduction location furthest from the at least one location or one or more reproduction location nearest the at least one location and the one or more further reproduction location may be respectively one of: one or more reproduction location nearest the at least one location or one or more reproduction location furthest from the at least one location, when the at least one location is within the second zone.

At least part of an audio signal associated with one or more reproduction locations may be based on the distances between the at least one location and a nearest boundary between the first and second zones and a nearest boundary between the second and third zones.

The apparatus caused to process the at least two audio signals may be caused to transfer at least part of an audio signal associated with one or more reproduction locations to at least one audio signal associated with one of more further reproduction locations, wherein the one or more reproduction locations is one of: one or more reproduction locations furthest from the at least one location or one or more reproduction locations nearest the at least one location and the one or more further reproduction location is respectively one of: one or more reproduction location nearest the at least one location or one or more reproduction location furthest from the at least one location, when the at least one location is within the second zone and furthermore distance attenuated when the at least one location is within the third zone.

The at least two zones may comprise at least one proximity zone, the at least one proximity zone being located at one of the at least two reproduction locations and wherein the apparatus caused to process the at least two audio signals may be caused to, when the at least one location is within one of the at least one proximity zone, transfer to an audio signal associated with the nearest reproduction location at least part of an audio signal associated with one or more reproduction location other than the nearest reproduction location.

The at least two zones may comprise at least one proximity zone, the at least one proximity zone may be located at one of the at least two reproduction locations and wherein the apparatus caused to process the at least two audio signals may be caused to, when the at least one location is within one of the at least one proximity zone, transfer at least part of an audio signal associated with the nearest reproduction location to at least one or more audio signal associated with a reproduction location other than the nearest reproduction location.

The audio reproduction space may at least comprise one of: a virtual loudspeaker configuration; and a real loudspeaker configuration.

According to a fourth aspect there is provided an apparatus comprising: obtaining circuitry configured to obtain at least two audio signals for reproduction, each of the at least two audio signals associated with a respective one of at least two reproduction locations within an audio reproduction space; obtaining circuitry configured to obtain within the audio reproduction space at least two zones; obtaining circuitry configured to obtain at least one location for a user's position within the audio reproduction space, the at least one location being relative to at least one of the at least two zones and the at least two reproduction locations; and processing circuitry configured to process the at least two audio signals based on the obtained at least one location for the user's position within the audio reproduction space to generate at least one output audio signal, the at least one output audio signal is reproduced from at least one of the at least two reproduction locations.

According to a fifth aspect there is provided a computer program comprising instructions [or a computer readable medium comprising program instructions] for causing an apparatus to perform at least the following: obtaining at least two audio signals for reproduction, each of the at least two audio signals associated with a respective one of at least two reproduction locations within an audio reproduction space; obtaining within the audio reproduction space at least two zones; obtaining at least one location for a user's position within the audio reproduction space, the at least one location being relative to at least one of the at least two zones and the at least two reproduction locations; and processing the at least two audio signals based on the obtained at least one location for the user's position within the audio reproduction space to generate at least one output audio signal, the at least one output audio signal is reproduced from at least one of the at least two reproduction locations.

According to a sixth aspect there is provided a non-transitory computer readable medium comprising program instructions for causing an apparatus to perform at least the following: obtaining at least two audio signals for reproduction, each of the at least two audio signals associated with a respective one of at least two reproduction locations within an audio reproduction space; obtaining within the audio reproduction space at least two zones; obtaining at least one location for a user's position within the audio reproduction space, the at least one location being relative to at least one of the at least two zones and the at least two reproduction locations; and processing the at least two audio signals based on the obtained at least one location for the user's position within the audio reproduction space to generate at least one output audio signal, the at least one output audio signal is reproduced from at least one of the at least two reproduction locations.

According to a seventh aspect there is provided an apparatus comprising: means for obtaining at least two audio signals for reproduction, each of the at least two audio signals associated with a respective one of at least two reproduction locations within an audio reproduction space; means for obtaining within the audio reproduction space at least two zones; means for obtaining at least one location for a user's position within the audio reproduction space, the at least one location being relative to at least one of the at least two zones and the at least two reproduction locations; and means for processing the at least two audio signals based on the obtained at least one location for the user's position within the audio reproduction space to generate at least one output audio signal, the at least one output audio signal is reproduced from at least one of the at least two reproduction locations.

According to an eighth aspect there is provided a computer readable medium comprising program instructions for causing an apparatus to perform at least the following: obtaining at least two audio signals for reproduction, each of the at least two audio signals associated with a respective one of at least two reproduction locations within an audio reproduction space; obtaining within the audio reproduction space at least two zones; obtaining at least one location for a user's position within the audio reproduction space, the at least one location being relative to at least one of the at least two zones and the at least two reproduction locations; and processing the at least two audio signals based on the obtained at least one location for the user's position within the audio reproduction space to generate at least one output audio signal, the at least one output audio signal is reproduced from at least one of the at least two reproduction locations.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for the provision of efficient rendering of spatial audio signals.

Figure 1:
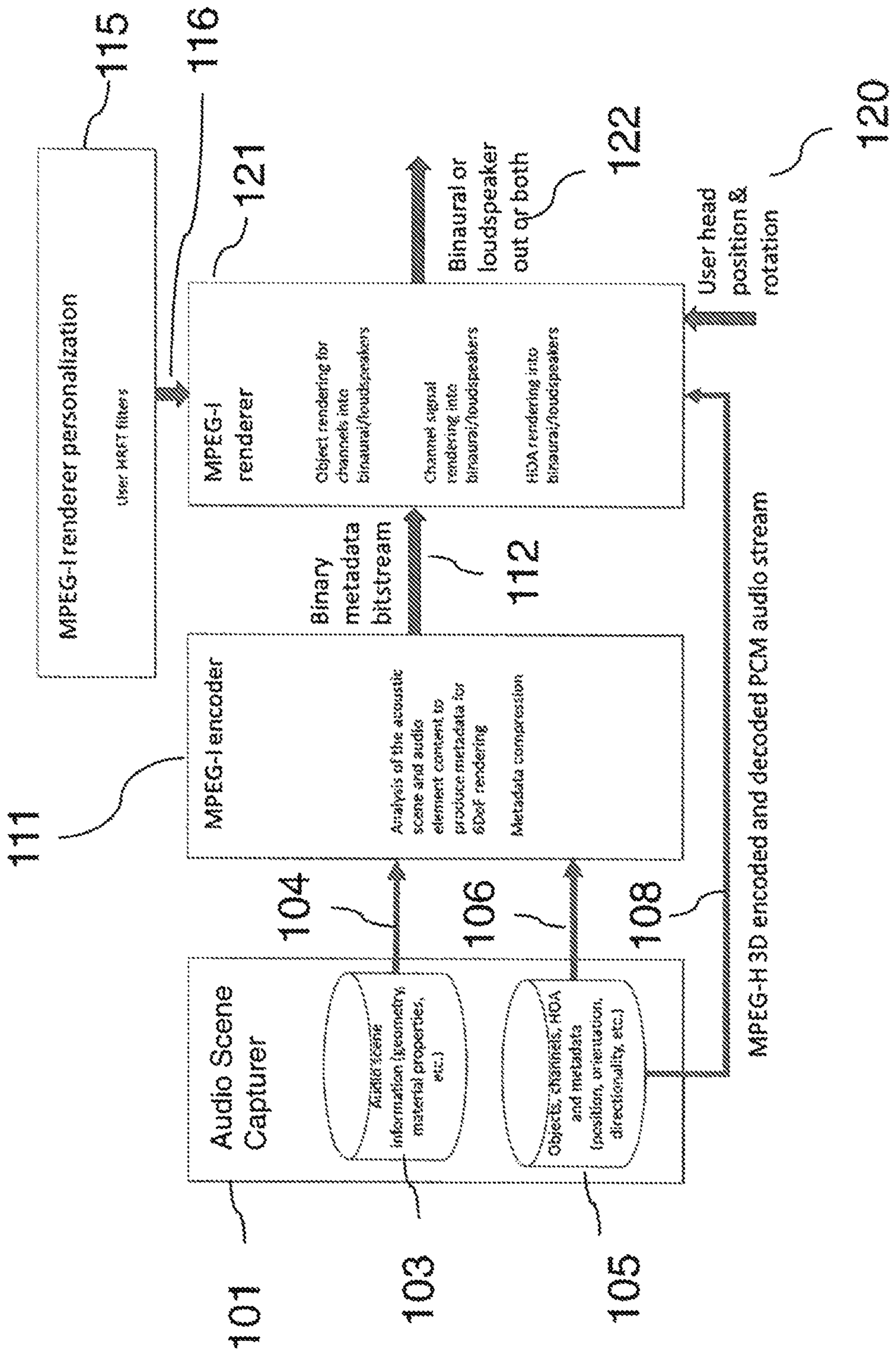
FIG. 1 shows schematically an example system suitable for implementing a zone based VLS audio modification according some embodiments.

FIG. 1 depicts an example system suitable for implementing some embodiments. The system shows a possible MPEG-I encoding, transmission, and rendering architecture. In the example shown in FIG. 1 the metadata and audio bitstreams are separate but in some embodiments the metadata and audio bitstreams are in the same bitstream.

In this example the 6DoF audio scene capturer 101 for capturing an audio scene in a manner suitable for MPEG-I encoding comprises audio elements 105. The audio elements may be audio objects, audio channels, or higher order ambisonic (HOA) audio signals. In some embodiments the audio elements furthermore comprise metadata parameters such as source directivity and size for audio objects. The audio elements 105 in some embodiments can be passed as a bitstream 106 to a MPEG-I encoder 111. In some embodiments the audio elements 105 are encoded with an MPEG-H 3D encoder to form an audio bitstream 108 which is then passed to a suitable MPEG-I renderer 121, which contains an MPEG-H 3D decoder. In some embodiments, the MPEG-H 3D encoding & decoding can happen before the MPEG-I audio renderer and a decoded PCM audio bitstream may be passed to the MPEG-I audio renderer.

The audio scene capturer 101 furthermore may comprise audio scene information 103. The audio scene information 103 can in some embodiments comprise scene description parameters in terms of the room/scene dimensions, geometry, and materials. The audio scene information 103 can also be passed as bitstream 104 to the MPEG-I encoder 111.

In some embodiments the system comprises a MPEG-I encoder 111. The MPEG-I encoder 111 is configured to receive the audio scene information 103 and the audio elements and metadata 105 and encode the audio scene information into a bitstream and send that together with the audio bitstream to the renderer 121 as a binary metadata bitstream 112. In some embodiments, the bitstream 112 can contain the encoded MPEG-H 3D audio bitstream as well.

In some embodiments the system further comprises a suitable means configured to generate a user head position and rotation signal 120. The user head position and rotation signal 120 may for example be generated by a suitable virtual reality/augmented reality/mixed reality headset. The user head position and rotation signal 120 may be passed to the MPEG-I renderer 121.

Additionally in some embodiments the system comprises a MPEG-I renderer personalization generator configured to generate personalization configuration metadata (or control data), for example a set of user head related transfer functions which are personalised to the user. The personalization configuration metadata 116 can then be passed to the MPEG-I renderer 121 to allow the render to personalise the output generated to the user.

In some embodiments the system furthermore comprises a MPEG-I renderer 121. The MPEG-I renderer 121 is configured to receive the binary metadata bitstream 112, the user head position and rotation signal 120 and the personalization configuration metadata 116. The MPEG-I renderer 121 can furthermore in some embodiments receive the MPEG-H 3D encoded PCM audio stream 108. The MPEG-I renderer 121 is then configured to create head-tracked binaural audio output or loudspeaker output for rendering the scenes in 6DoF using the audio elements and the produced metadata, along with the current listener position.

There are several scenarios for rendering using virtual loudspeakers in MPEG-I. In some embodiments the output can be virtual loudspeakers which are user centric or physically positioned in the virtual world. In the case the virtual loudspeakers are positioned in the virtual world, they can furthermore be characterised by metadata such as directional pattern properties. In some embodiments the renderer is configured to create special effects such as making a seamless transition from user-locked virtual loudspeakers to world locked loudspeakers.

In some situations the content can be (pre)mixed as a loudspeaker configuration which does not match the output (virtual) loudspeaker configuration. In some embodiments the MPEG-I renderer is configured to generate a perceptually plausible rendering of the (pre)mixed audio signals (surround content).

In 6DoF virtual reality applications there may be multiple possible sound source types present. Typically many of the sources are (single channel) audio objects. However, with spatial sound capture, it is also desirable to be able to reproduce spatial sound (e.g., parametric spatial audio such as MASA Metadata-assisted spatial audio) in the virtual reality (or augmented reality/mixed reality) applications. Furthermore, (pre)mixed channel-based spatial content (e.g., 5.1 mix) may be employed, e.g., as a background soundtrack. The following focusses on the last sound source type which may be possibly extended to the second source type in some cases.

Conventionally, a (pre)mixed loudspeaker format is reproduced with loudspeakers. However, in 6DoF virtual reality applications the loudspeakers are not always used to reproduce the final mix and it is often necessary to also affect the sound sources based on the user interaction. That is, if the (pre)mixed sound source is "head-locked" or "user-locked", it can be reproduced statically using virtual or real loudspeakers surrounding the user/listener. However, if the (pre)mixed sound source is "world-locked", it needs to react to the user interaction in a perceptually plausible way. This means that there needs to be modifications to the individual premixed channels based on the user interaction. Furthermore the modifications need to follow rules as the (pre) mixed content has usually been created with a careful balance between channels by a professional sound mixer and the presentation to user should generally preserve this balance as much as possible. On the other hand, for the user to fully control the output (and therefore have a proper UI effect), this balance may need to be broken.

The following embodiments furthermore attempt to reduce perceptual distortion. Perceptual coding methods can be employed in multichannel audio. One effect of this is that a single loudspeaker (channel) may output a perceptually distorted signal when listened to alone or from a close listening position. It is the combined contribution of all the channels at the listening sweet spot which achieves a high-quality spatial perception with minimal perceptual distortion even at reduced bit rates. In a 6DoF use case with "world-locked" content, the user is able to approach individual channels and therefore would experience the perceptual distortion.

Perceptual distortion can be improved in some embodiments over real-world listening of parametric audio using loudspeakers. Although content produced with this limitation in mind may not be as affected, legacy content in pre-encoded form and reduced bit rate encoded content can be affected and the embodiments as described herein attempt to improve the perceptual performance.

The concept as discussed herein is related to 6DoF virtual reality (or augmented reality or mixed reality) sound reproduction. The embodiments discussed herein describe the reproduction of (pre)mixed loudspeaker-channel-based content (e.g., 5.1 mix). In some embodiments, the input and reproduction formats can be any suitable spatial audio content or any other content (and which in some embodiments is designed to be reproduced by loudspeakers). The embodiments present a mixing scheme that provides quality enhancement to a listener of (pre)mixed loudspeaker content when the listener or user of the reproduction apparatus is "moving" in relation to the (virtual) loudspeaker locations. The "moving" may involve movement in a virtual sound space which is determined based on actual movement or user inputs.

The embodiments may implement the mixing scheme as processing or modification of mixing gain matrices based on determined geometry distances (within the sound space) in order to achieve a good perceptual quality reproduction without any annoying artifacts.

In some embodiments the method synthesizes the (pre) mixed content in the virtual reality (audio scene) using a virtual loudspeaker (VLS) arrangement (in other words defining virtual single channel sound sources that have a specific group relation). The method furthermore affects the reproduction of this content through these VLS based on the user interaction. The modifications/processing performed to the VLS audio signals are in some embodiments based on a zoning of the reproduction audio scene.

In some embodiments this zoning can define at least three zones:

Zone 1: an innermost or central region, this is a constant balance zone where VLS channels are not affected at all, or only the direction of sound is affected. When within this zone the mixed content (the audio signals associated with each VLS) is therefore unprocessed or is only processed based on the direction that the user or listener is facing.

Zone 2: an intermediate zone which surrounds zone 1, within this zone the VLS channels (the audio signals associated with each VLS) are processed in a manner as described in further detail herein.

Zone 3: an outer zone which surrounds zone 2 and may extend infinitely outwards, within this zone there may be further modification or processing of the VLS channels.

In some embodiments the processing or modifications to the audio signals associated with each VLS can be, for example, the changing of levels and timbre of the audio signals associated with each VLS channel to create the effect of user movement in relation to the (pre)mixed content.

In some embodiments the zoning can create zones automatically. For example, the innermost zone, Zone 1, can in some embodiments be the polygonal area represented by vertices in space that are at the mid points between the centre point of all VLS and the location of each VLS. The intermediate zone, Zone 2 can then in some embodiments be defined to extend from the outer edge of Zone 1 to an equal distance outwards. The outermost zone, Zone 3 can then in some embodiments start from the outer edge of Zone 2 and extend outwards. This shape of the zones described herein are examples only and any suitable shape or zoning arrangement can be employed where zone 1 is within zone 2, and zone 2 is within zone 3.

In some embodiments around the location of each VLS channel, there may also be defined a proximity zone that safeguards the user or listener from hearing "too much" of the single channel content. In other words when the system is going to render to the user or listener an audio signal which is dominated by a single VLS channel (and the user moves within the proximity zone associated with the VLS channel) then the content is provided by at least one other VLS, or the content from other VLS is mixed to the proximate VLS channel. These proximity zones can in some embodiments also be automatically defined.

In some embodiments, the content can be streamed from a server in a joint system of encoded channel-based content and object-based form. This may be an extension of earlier described embodiments by using the object audio to offer optimal quality when the user or listener is located near a VLS channel position while optimizing the use of bitrate overall.

In some embodiments the methods as described herein can be applied to real-world listening of channel-based audio as similar effects can be experienced when a user moves within the real-world. In these embodiments, a user position is tracked in relation to the loudspeakers and the same or similar processing or modification to loudspeaker channel audio signals is applied.

The embodiments may for example be employed where there is (pre)mixed channel-based (legacy) content according to a loudspeaker setup that is intended to be presented to the user in a 6DoF environment with fixed (or substantially fixed) virtual loudspeaker positions. This audio quality user experience is improved by the application of the embodiments as described herein.

In some embodiments the processing operations as described herein may be applicable to more than one user simultaneously listening to the same set of loudspeakers or VLS.

The embodiments may be implemented within a (6DoF) renderer such as shown in FIG. 1 as the MPEG-I renderer 121. In some embodiments the renderer is implemented as a software product on one or more processors and is configured to implements a suitable standard (e.g., MPEG-I) or proprietary format. An example is using hardware components or dedicated processors to perform at least part of the MPEG-H 3D audio bitstream decoding and software processing for the necessary 6DoF rendering using MPEG-I metadata. The renderer can furthermore in some embodiments be implemented as part of a hardware product such as a system including a head-mounted display (HMD) for visual presentation and (head-tracked) headphones or any other suitable means of audio presentation. The embodiments may in some embodiments be part of a 6DoF audio standard specification and metadata definition, e.g., MPEG-I 6DoF Audio.

Figure 2A:
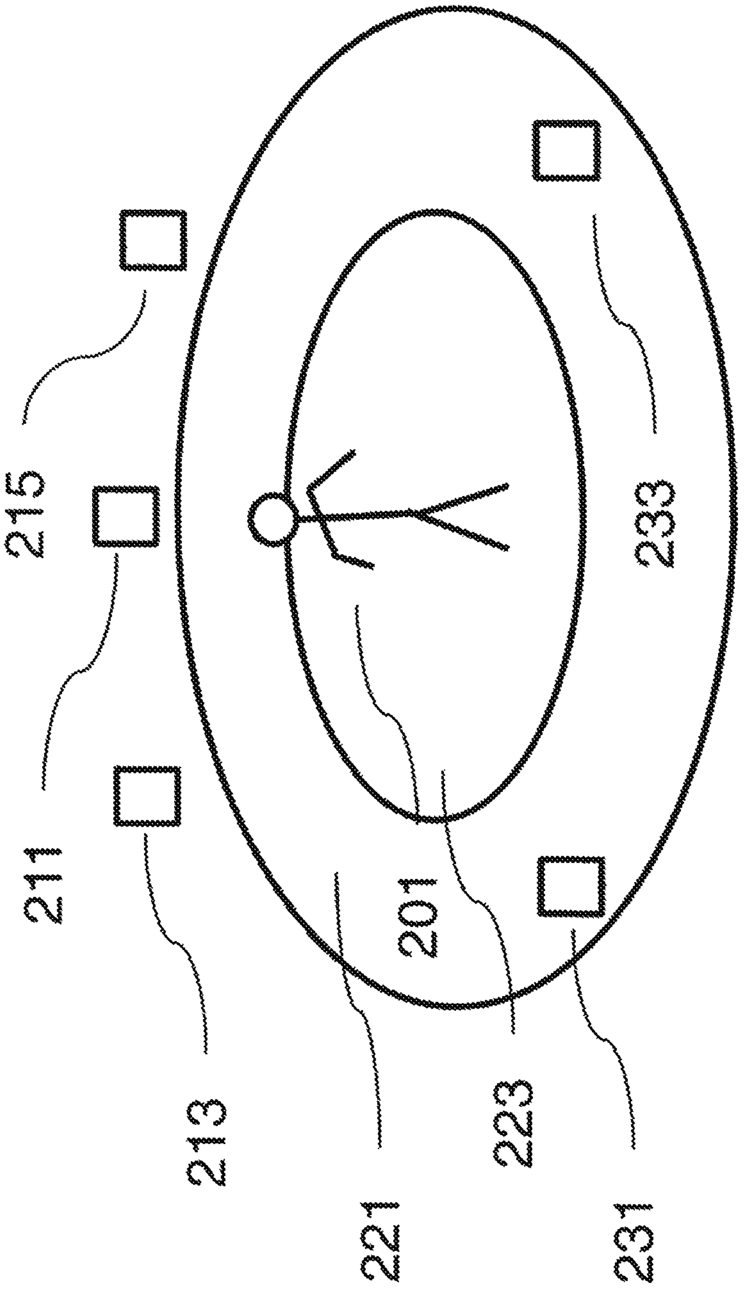
FIGS. 2*a* to 2*d* show schematically zone based VLS audio modification according to some embodiments.
Figure 2B:
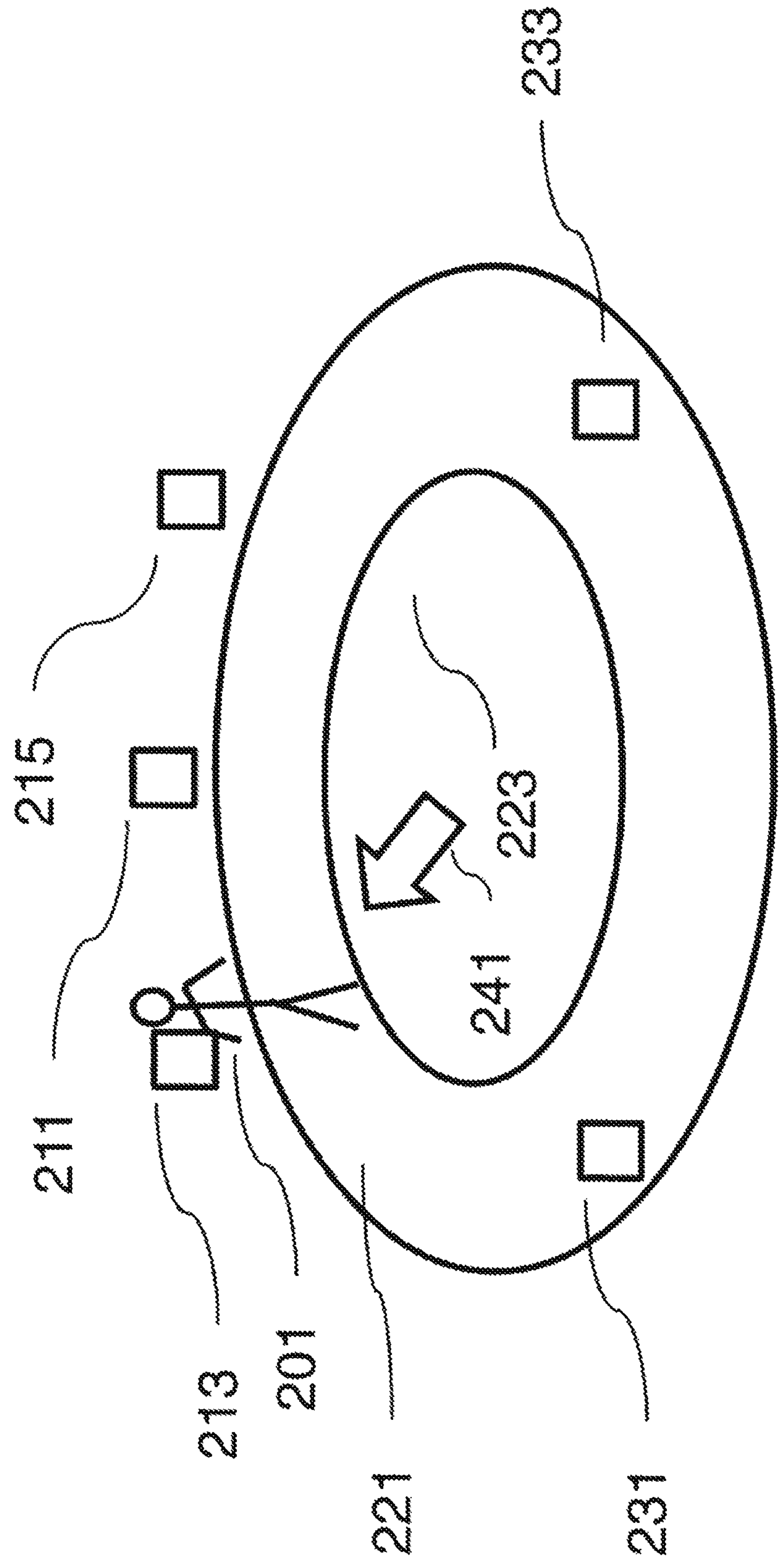
Figure 2C:
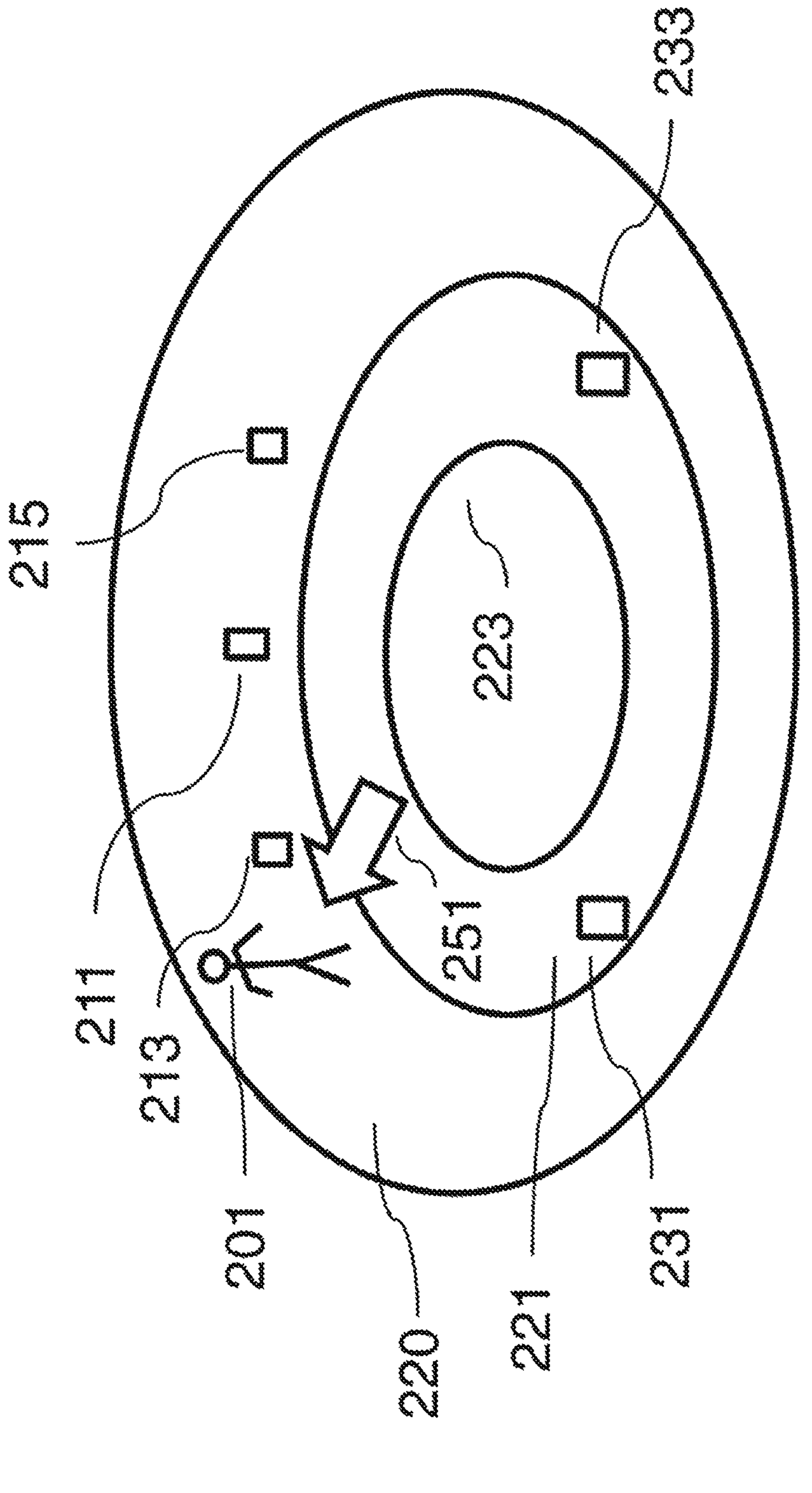

With respect to FIGS. 2*a* to 2*c* is shown an example zoning for a VLS channel audio signal processing (or zonal/zoning based audio signal processing) according to some embodiments. The zoning in some embodiments may be implemented by a zoning processor (or zoning circuitry or suitable means for zoning). The zoning processor may in some embodiments be implemented within the renderer or separate from the renderer. The zones can be of any shape although a simple example may be a circular/spherical zone arrangement wherein the shape of zones is defined by the loudspeaker setup and the loudspeakers are located within the intermediate zone, zone 2. In this example is shown zones 1-3 where the outermost zone, zone 3 extends to infinity. Furthermore, in some embodiments the zoning processor (or zoning circuitry or suitable means for zoning) is configured to define at least one proximity zone. The at least one proximity zone defines a space or region surrounding each of the VLS channels.

FIGS. 2*a* to 2*c* furthermore illustrate movement of a user 201 within a 6DoF audio scene with the VLS utilized for playback of suitable channel based audio signals, e.g., a legacy channel-based pre-mixed content (in this example, a 5.0 or 5.1 content). In conventional rendering each channel output corresponds to what is experienced in real life with movement relative to a real loudspeaker setup.

FIG. 2*a* for example shows a listener or user 201 located centrally within the 6DoF audio scene. The 6DoF audio scene may be a virtual (reality) audio scene, an augmented (reality) audio scene, a mixed reality audio scene (or as described above a real-world audio scene). Within the 6DoF audio scene is furthermore shown a set of virtual loudspeakers (VLS) (or in the real world real loudspeakers) which are located at defined positions. For example there is shown in FIG. 2*a* a front centre (C) speaker 211, a front left (FL) speaker 213, a front right (FR) speaker 215, a rear left (or back left (BL)) speaker 231 and rear right (or back right (BR)) speaker 233. These are located at expected positions relative to the user or listener 201. Additionally is shown that the user or listener 201 is located centrally and within zone 1 (the innermost zone) 223. FIG. 2*a* furthermore shows the intermediate zone, zone 2 221, which surrounds the innermost zone, zone 1 223.

FIG. 2*b* illustrates a movement 241 of the user 201 within the 6DoF audio scene from the central location as shown in FIG. 2*a* to a location near the front left speaker 213. Thus FIG. 2*b* shows that the user 201 has moved 241 from zone 1 223 into zone 2 221.

FIG. 2*c* illustrates a further movement 251 of the user 201 within the 6DoF audio scene from the location shown in FIG. 2*b* near to the front left speaker 213 to an outer zone, zone 3 220.

Figure 3:
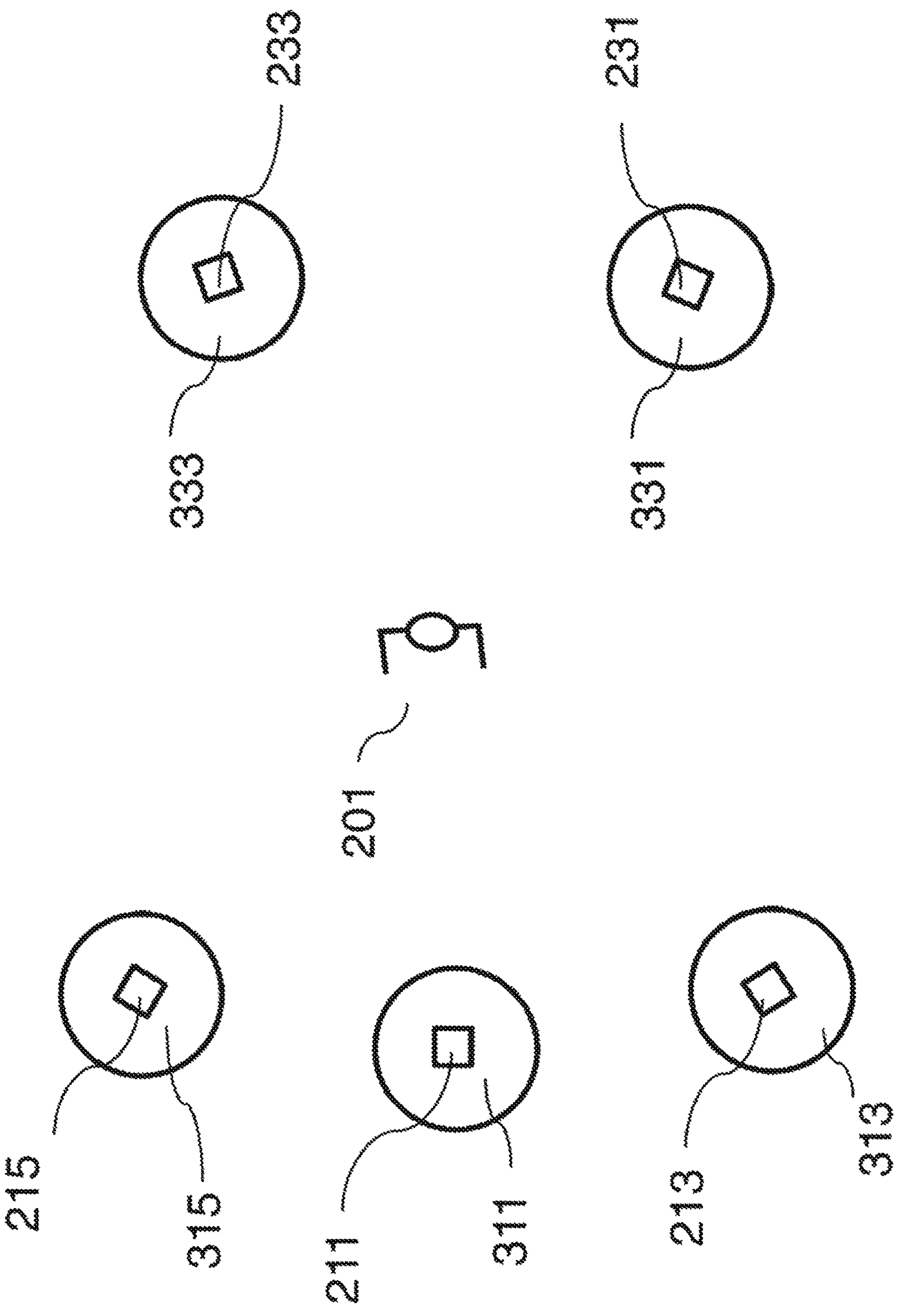
FIG. 3 shows schematically example loudspeaker/channel specific proximity zones for use in the system as shown in FIG. 1 according to some embodiments.

FIG. 3 furthermore shows example proximity zone which surround each VLS location. Thus, for the example shown in FIG. 3, there is shown the front centre speaker 211, the front left speaker 213, the front right speaker 215, the rear left speaker 231 and the rear right speaker 233 relative to the user or listener 201.

Additionally surrounding the front centre speaker 211 is a front centre proximity zone 311, surrounding the front left speaker 213 is a front left proximity zone 313, surrounding the front right speaker 215 is a front right proximity zone 315, surrounding the rear left speaker 231 is a rear left proximity zone 331 and surrounding the rear right speaker 233 a rear right proximity zone 333.

Conventionally when the bit rate is sufficiently low, the listener may when leaving the 'sweet-spot' area and/or approaching a single loudspeaker experience a poor quality presentation of the audio signals. This is due to the multichannel loudspeaker signals being usually created in such way that the intended consumption is at the sweet spot or near it. This applies to both channel-based premixed content where emphasis of a single loudspeaker signal disrupts the artistic intent, and parametric audio rendering where rendering is created in such way that it sounds perceptually correct around the sweet spot. Thus, a single loudspeaker signal may have a limited part of the total content causing a listener near it to make the content (for example, a guitar track) to be too pronounced.

In some embodiments each VLS channel audio signal is processed (modified) based on the user location in relation to the VLS location. For example, this is achieved using a zone-based system as is illustrated in FIGS. 2*a* to 2*c* and FIG. 3.

Figure 2D:
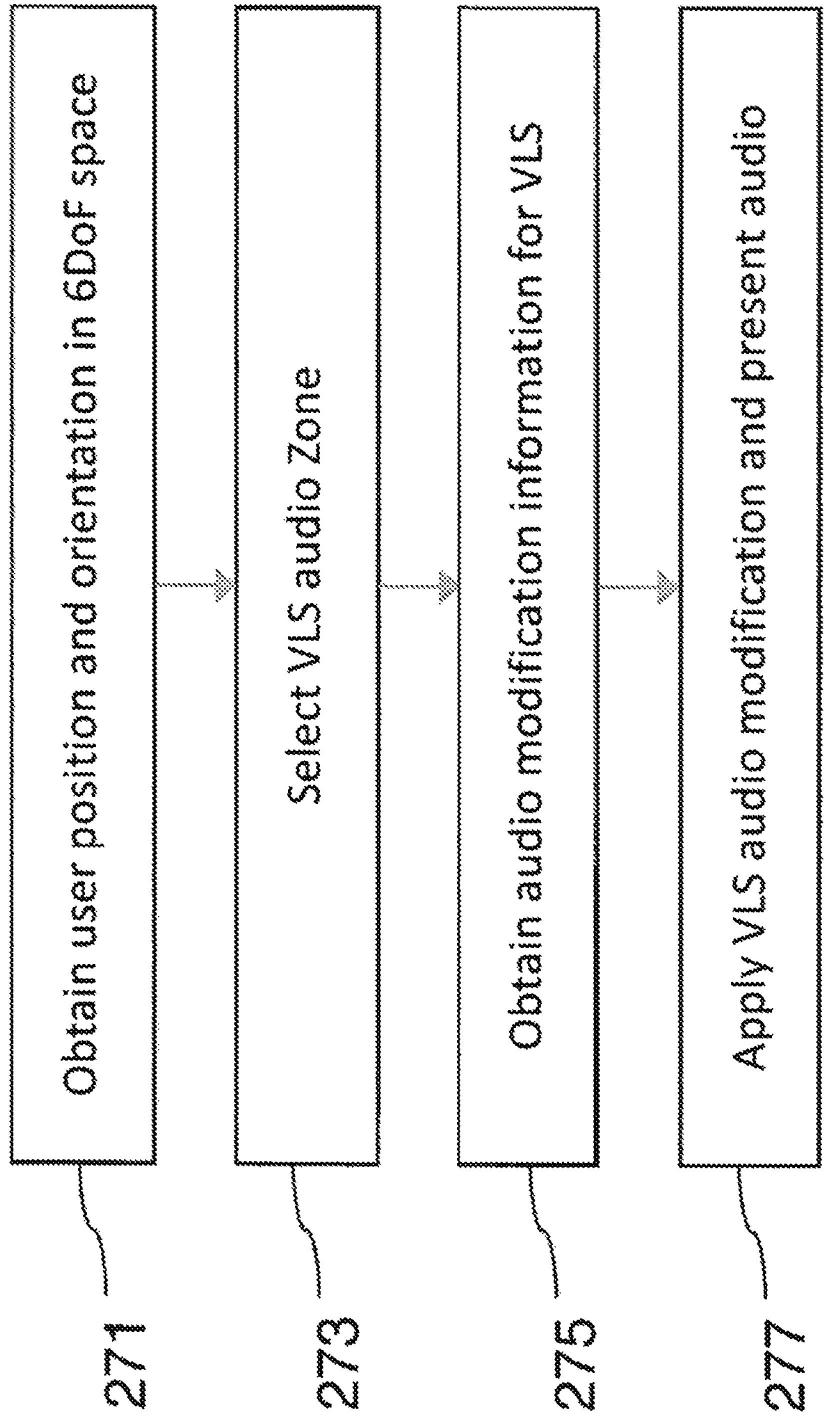

With respect to FIG. 2*d* is shown a flow diagram showing the operation of the renderer based on the zonal based processing according to some embodiments.

The first operation is one of obtaining the user or listener position and orientation in the 6DoF audio scene. This is shown for example in FIG. 2*d* by step 271.

The next operation is determining or selecting the VLS audio zone based on the obtained user or listener position and based on the VLS audio zoning of the audio scene as shown in FIG. 2*d* by step 273.

Having determined or selected the VLS audio zone then the audio modification or processing information for the VLS audio zone is determined as shown in FIG. 2*d* by step 275.

The VLS audio zone processing information may then be applied to the VLS channel audio signals based on the user or listener's location relative to the VLS location and the resultant audio signals are then presented to the user or listener as shown in FIG. 2*d* by step 277.

Thus in addition to the zones 1 to 3 the proximity zone is implemented around each loudspeaker to ensure that if the user or listener goes near any loudspeaker, the audio signals are processed such that the listener perceives the sound as intended.

In the embodiments as described herein the renderer is not configured to perform delay matching between the audio signals in virtual reality as delays can be introduced elsewhere. Alternatively, if delays between VLS are present, they can be matched (with delay lines) using the available delay information or the delay information can be obtained with commonly known cross-correlation methods.

In some embodiments the zonal based audio signal processing is configured to focus on maximizing the clarity of the content for the listener or user. In such embodiments, the audio signal content is transferred towards one or more VLS nearest to the listener or user location.

Figure 4:
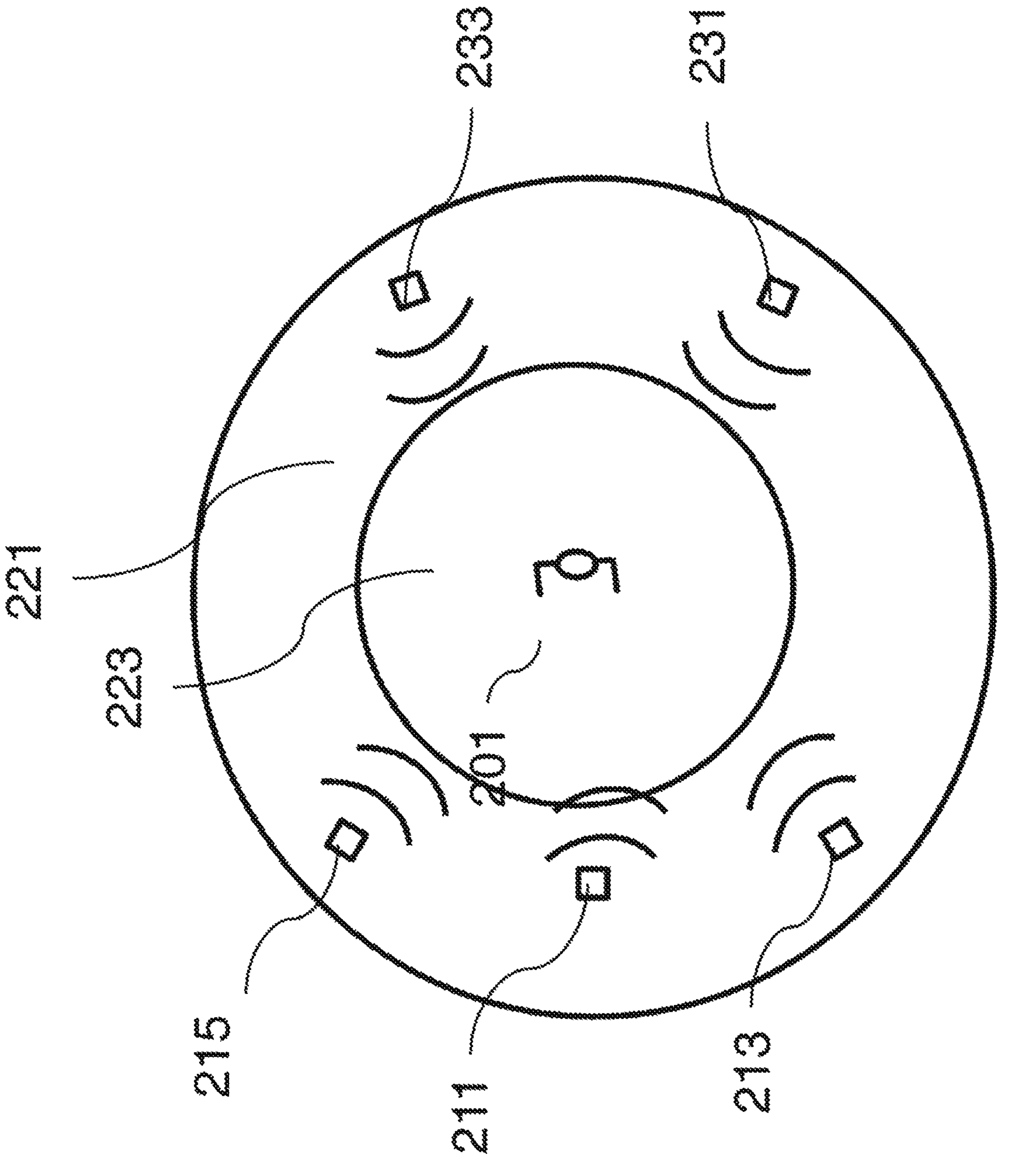
FIG. 4 shows schematically example rendering scheme when the user apparatus is within a first zone when employing the system as shown in FIG. 1 according to some embodiments.

The listener or user may for example be in zone 1 223, such as shown in FIG. 4, where there is shown the front centre speaker 211, the front left speaker 213, the front right speaker 215, the rear left speaker 231 and the rear right speaker 233 relative to the user or listener 201. In some embodiments when the user is located within zone 1 223 then the audio signals are not affected or processed at all, in other words the VLS channel audio signals are passed without zonal processing. In some embodiments the VLS channel audio signals are compensated to maintain equal sound levels with respect to the listener or user when distance attenuation is implemented.

Figure 5:
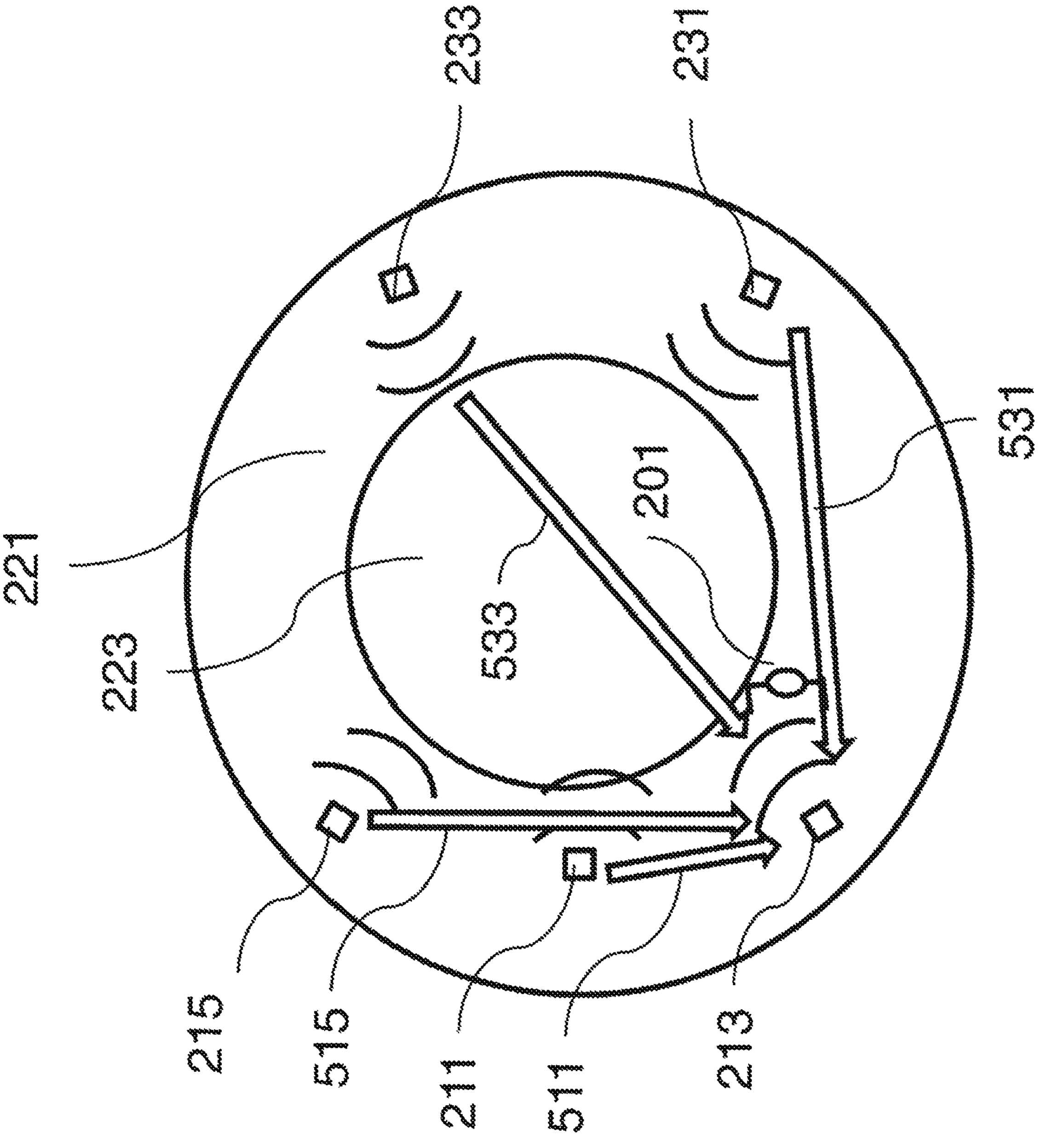
FIG. 5 shows schematically example rendering scheme when the user apparatus is within a second zone when employing the system as shown in FIG. 1 according to some embodiments.

The listener or user may for example be in zone 2 221, such as shown in FIG. 5, where there is shown the front centre speaker 211, the front left speaker 213, the front right speaker 215, the rear left speaker 231 and the rear right speaker 233 relative to the user or listener 201. In such embodiments the audio signal content from VLS channels is directed toward the VLS channel nearest the listener or user. This is shown in FIG. 5 by the arrows 511, 515, 533 and 531 which signify the transfer of audio signal content from the front centre 211, front right 215, rear right 233 and real left 231 speakers to the nearest speaker, the front left 213.

This can be implemented in such a manner that it is implemented gradually so that when on the border of zones 1 & 2 there is no change and when on the border of zones 2 & 3, the signal content of the other VLS has been completely moved to the VLS nearest the listener or user. The interpolation or graduation can be any suitable function, such as a linear function from no processing to complete VLS audio transfer or non-linear function.

Figure 6:
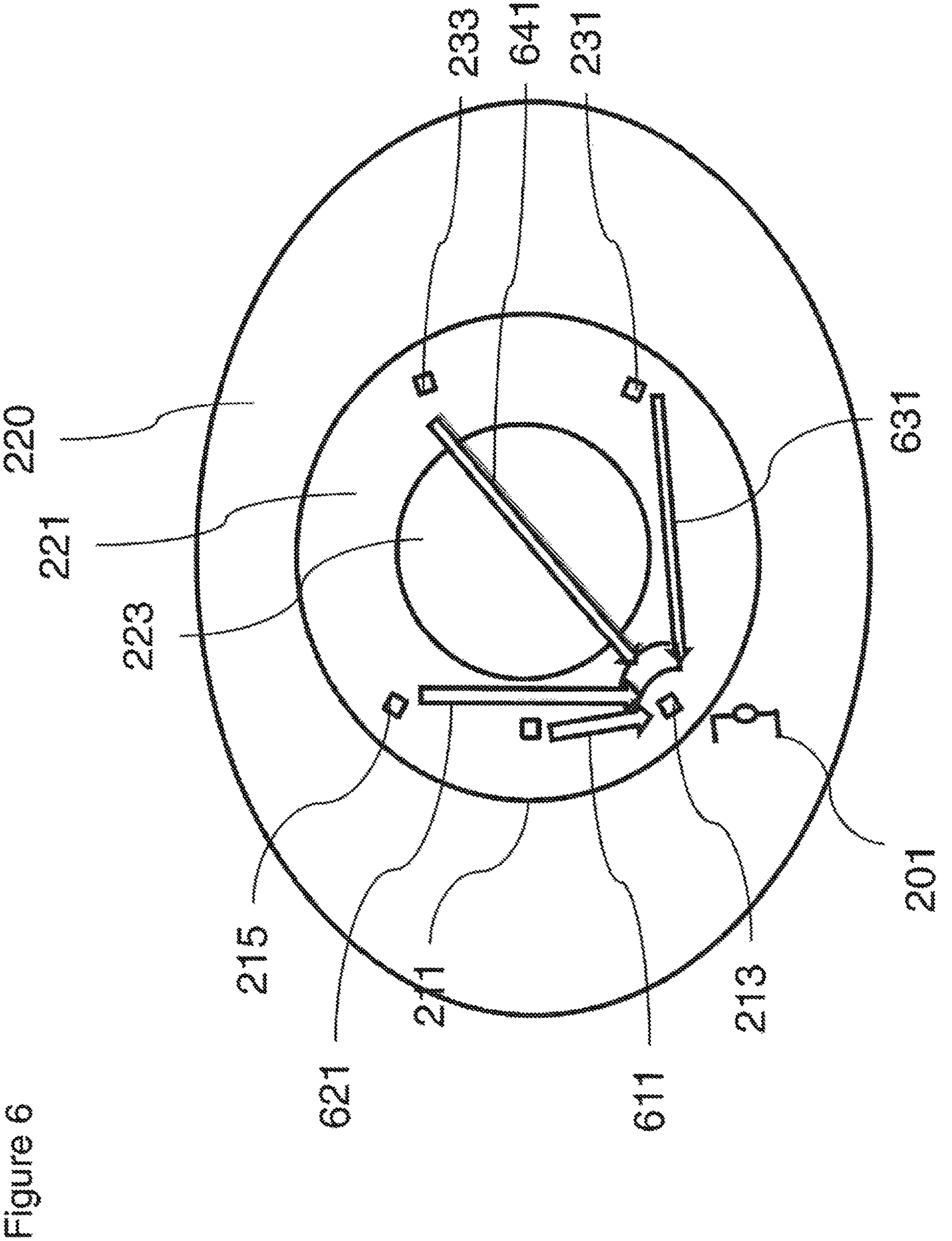
FIG. 6 shows schematically example rendering scheme when the user apparatus is within a third zone when employing the system as shown in FIG. 1 according to some embodiments.

The listener or user may for example be in zone 3 220, such as shown in FIG. 6, where there is shown the front centre speaker 211, the front left speaker 213, the front right speaker 215, the rear left speaker 231 and the rear right speaker 233. In such embodiments the audio signal content from other VLS channels are fully moved or transferred to the nearest VLS and furthermore optionally a distance attenuation can be applied to reduce the signal level as the listener or user moves from the zone border. This is shown in FIG. 6 by the arrows 611, 621, 631 and 641 which signify the transfer of audio signal content from the front centre 211, front right 215, rear left 231 and rear right 233 speakers to the nearest speaker, the front left 213 speaker respectively.

Additionally in some embodiments when the user enters any of the defined proximity zones (the zones immediately surrounding the VLS location), all of the audio content is gradually moved to that specific VLS based on how near the user is to the VLS (this may be implemented in such a manner that the closer the user or listener is to the VLS more of the audio content is moved).

In some embodiments this may be implemented in the following manner.

First, a mixing matrix M is defined. In this example 5 VLS channels are defined (as shown in figures) and the mixing matrix can be defined as a 5-by-5 matrix with gains defining how the original signals of each VLS $s_{in}(n)$ are mixed into modified VLS signals $s_{out}(m)$ that are used for final reproduction.

The mixing matrix may thus be defined as:

$$M = \begin{bmatrix} g_{11} & g_{12} & g_{13} & g_{14} & g_{15} \\ g_{21} & g_{22} & g_{23} & g_{24} & g_{25} \\ g_{31} & g_{32} & g_{33} & g_{34} & g_{35} \\ g_{41} & g_{42} & g_{43} & g_{44} & g_{45} \\ g_{51} & g_{52} & g_{53} & g_{54} & g_{55} \end{bmatrix}.$$

In some embodiments the renderer is configured to initialize this mixing matrix to an identity matrix, i.e., $$M = I = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}.$$

This means that every input and output signals of each VLS are exactly the same. The initialization of the mixing matrix is shown in FIG. 7 by step 701.

The next operation is to obtain the listener or user location, the VLS locations, and the zone areas in the sound scene (virtual space). This can be performed in any suitable manner as is shown in FIG. 7 by step 703.

Figure 7:
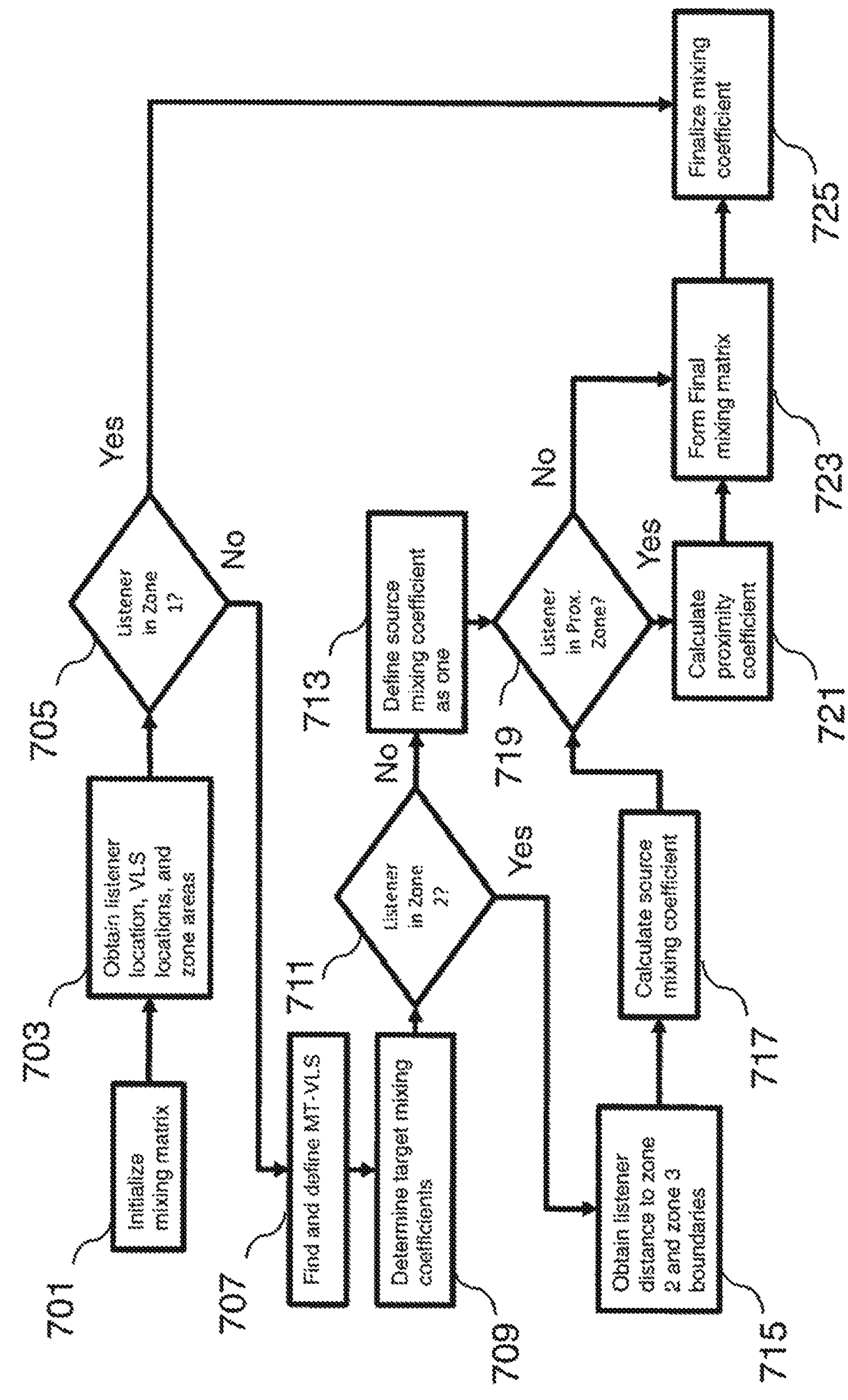
FIG. 7 shows a flow diagram of the operation of the example system as shown in FIG. 1 according to some embodiments.

The next operation is to check if the listener is in the Zone 1. This can be performed using any suitable method. This check is shown in FIG. 7 by step 705.

Where the check determines that the listener or user is in Zone 1 then no modifications are performed, and the mixing matrix is left as is and output or applied to the input VLS channel audio signals to generate the output VLS channel audio signals as shown in FIG. 7 by step 725.

When the check determines that the listener is not in the zone 1 then the next operation is to find one or more VLS channels closest to the user or listener and define these as mixing target VLS (MT-VLS). These are the loudspeakers that will receive signal energy from other VLS that are defined as mixing source VLS (MS-VLS). The number of VLS channels to select may be one to three but any number less than the total number of VLS may be selected. The determination of/finding (and defining) the mixing target VLS is shown in FIG. 7 by step 707.

Having defined the mixing target VLS the mixing coefficients for these VLS are then determined. This can be implemented based on any suitable panning method. In some embodiments more energy is distributed to the MT-VLS that is closer to the listener or user. In some embodiments an inverse distance is used to form a target mixing coefficient for the energy, such as described here $$\tau_m = \frac{\frac{1}{d_m}}{\sum_{i \in MT-VLS,} \frac{1}{d_i}}$$

Here $d_m$ is the distance from listener to each MT-VLS and m is the index for that MT-VLS. If for some reason the listener would be able to co-locate any VLS, i.e., $d_m=0$, then $\tau_m=1$ for that VLS and $\tau_m=0$ for other MT-VLS. This target mixing coefficient defines how the received signal energy is distributed to MT-VLS.

In some embodiments where there is only one MT-VLS, then the target mixing coefficient is always one.

and there is a maximum effect when the listener is at the zone 2 & 3 border and change is smoothed within zone 2. This determination is shown in FIG. 7 by step 717.

Having determined the source mixing coefficient a further check can be performed to determine whether the listener is within one of the proximity zones surrounding any of the VLS. This can be again implemented according to any suitable method and is shown in FIG. 7 by step 719.

If it is determined that the listener is in a proximity zone, then a proximity coefficient ρ is calculated. For example the coefficient can be calculated as follows:

$$\rho=\max(0,\min(1,c[d_{pz}-d_{PVLS}]))$$

Here $d_{pz}$ is the proximity zone radius from the VLS and $d_{PVLS}$ is listener's distance from the VLS in the proximity zone. c is an effect multiplier constant and affects how quickly the proximity effect is applied. A typical value for the effect multiplier constant may be 2. The determination of the proximity coefficient is shown in FIG. 7 by step 721.

After determining the proximity coefficient or when the listener is not within a proximity zone radius then a modified mixing matrix can be formed. In some embodiments this can be done by taking a square root of each term as the coefficients are formed for energy but coefficients for amplitude are required. In some embodiments although the full matrix is complex it can be simplified in many cases.

For example an example matrix is shown where the listener is in zone 2, VLS 1 and 2 are the MT-VLS, and the listener is in proximity of VLS 1.

$$M = \begin{bmatrix} 1 & \sqrt{\rho} & \sqrt{\rho+\sigma\tau_1(1-\rho)} & \sqrt{\rho+\sigma\tau_1(1-\rho)} & \sqrt{\rho+\sigma\tau_1(1-\rho)} \\ 0 & \sqrt{1-p} & \sqrt{\sigma\tau_2(1-\rho)} & \sqrt{\sigma\tau_2(1-\rho)} & \sqrt{\sigma\tau_2(1-\rho)} \\ 0 & 0 & \sqrt{(1-\sigma)(1-\rho)} & 0 & 0 \\ 0 & 0 & 0 & \sqrt{(1-\sigma)(1-\rho)} & 0 \\ 0 & 0 & 0 & 0 & \sqrt{(1-\sigma)(1-\rho)} \end{bmatrix}$$

The determination of the mixing coefficients for the determined or selected VLS is shown in FIG. 7 by step 709.

The method may then perform a further check to determine whether the listener is in Zone 2 or Zone 3. This can again be implemented by any suitable method (for example any suitable VR system location check). The check whether the listener is in zone 2 or 3 is shown in FIG. 7 by step 711.

When the check determines that the listener is in zone 3 (or not in zone 2 in the check) then the method may then generate a source mixing coefficient σ for energy. This value is equal for each MS-VLS and signifies how much of the energy is removed from each MS-VLS. Which when the listener is in Zone 3, σ=1. This is shown in FIG. 7 by step 713.

When the check determines that the listener is in zone 2 then the source mixing coefficient σ for energy is generated by first obtaining a listener distance to Zone 1 & 2 and Zone 2 & 3 borders (this may be the shortest distance) as shown in FIG. 7 by step 715. Having determined the distances from the listener to the closest zone borders then the source mixing coefficient can be determined as:

$$\sigma = \frac{d_{z12}}{d_{z12}+d_{z23}}$$

Here $d_{z12}$ and $d_{z23}$ are the distances to zone 1 & 2 border and zone 2 & 3 border correspondingly. This means that there is no effect when the listener is at the zone 1 & 2 border Each of the matrix elements can be constructed with the following rules:

1. If m=n
   a. For proximity speaker, $g_{mn}=1$
   b. For other MT-VLS, $g_{mn}=\sqrt{1-\rho}$
   c. For MS-VLS, $g_{mn}=\sqrt{(1-\sigma)(1-\rho)}$
2. Else if m≠n and n∈MS-VLS, m∈MT-VLS
   a. If m is proximity speaker, then $g_{mn}=\sqrt{\rho+\sigma\tau_m(1-\rho)}$
   b. Else $g_{mn}=\sqrt{\sigma\tau_m(1-\rho)}$
3. Else if m≠n and n∈MT-VLS, m∈MT-VLS
   a. If m is proximity speaker, then $g_{mn}=\sqrt{\rho}$
4. Else, $g_{mn}=0$ Each of these gain terms have square root included as the formulated coefficients are for mixing energy and proper gain coefficients are obtained by taking a square root.

The forming of the mixing matrix is shown in FIG. 7 by step 723 and then the outputting/application of the mixing matrix is shown in FIG. 7 by step 725.

Figure 8:
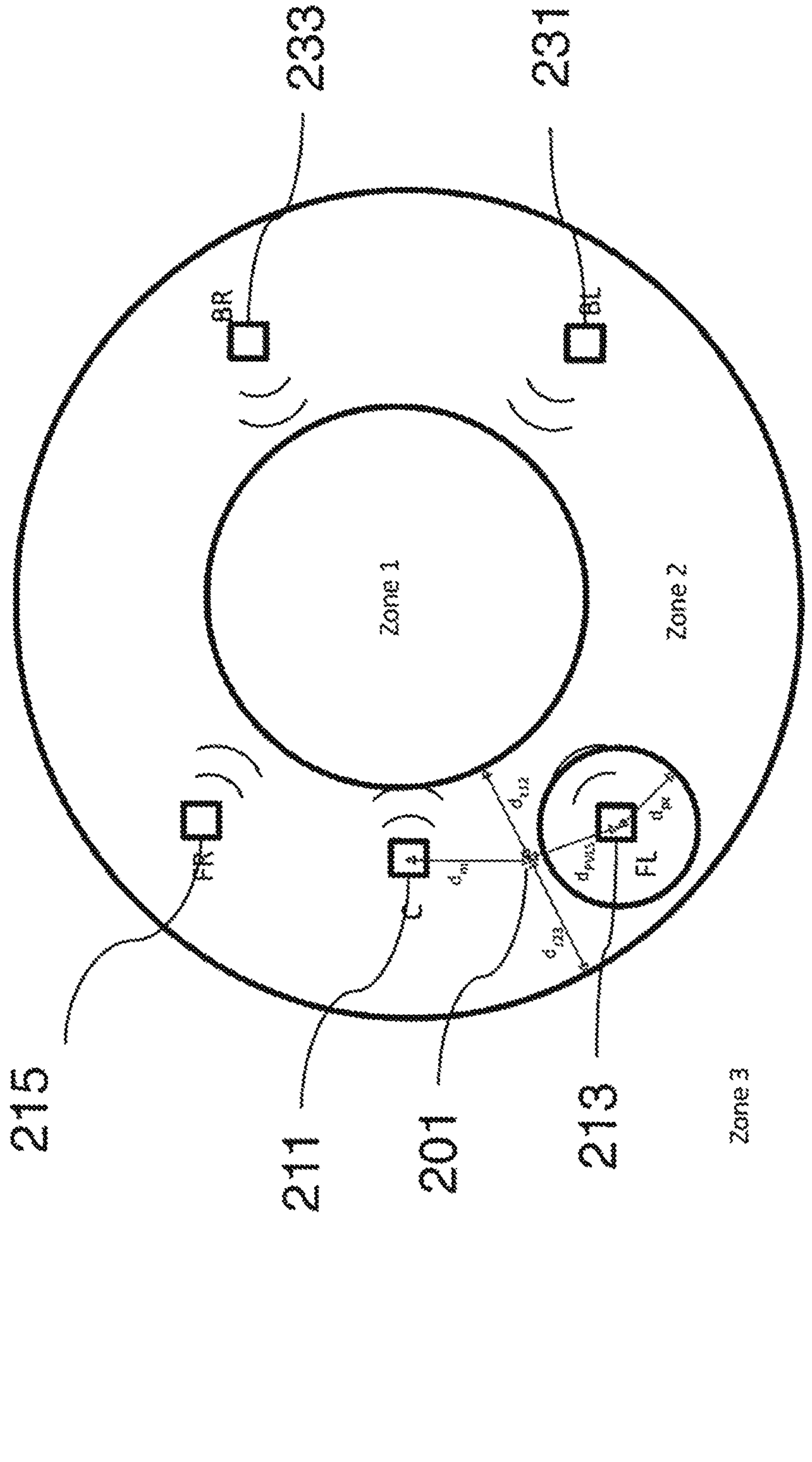
FIG. 8 shows schematically distance measures which may be measured in the example rendering scheme as shown in FIG. 1 according to some embodiments.

With respect to FIG. 8 is shown the example distance measurements. Thus for example the user or listener 201, there is shown the front centre speaker 211, the front left speaker 213, the front right speaker 215, the rear left speaker 231 and the rear right speaker 233 relative to the user or listener 201. Additionally is shown the listener distance to zone 1 & 2 border, $d_{z12}$, the listener distance to the zone 2 & 3 border, $d_{z23}$, an example distance from the listener to each MT-VLS $d_m$ and example proximity zone radius from the VLS $d_{pz}$ and a listener's distance from the VLS in the proximity zone $d_{PVLS}$.

In some embodiments the audio signal content processing focuses on maximizing the spatiality of the content for the user. In such embodiments the audio signal content processing is configured to direct audio signal content away from the nearest VLS, in other words producing an effect which is opposite to the embodiments such as described with respect to FIG. 7.

This can be implemented in some embodiments by the application of the following audio signal processing rules. When the listener is located in zone 1, the sound (audio signals) are not additionally processed (or affected) by the zonal processing. When the listener is located in zone 2, the audio signal content is directed from VLS nearest to the user towards the other VLS. In some embodiments the further user moves from the zone 1 & 2 border towards the zone 2 & 3 border, the more the audio signal content is moved. When the listener is located in zone 3, and as the listener moves away from the zone 2 & 3 border then the signal content is moved back to the original VLS. Furthermore if the listener enters a proximity zone of any VLS, the signal content is moved away from that VLS.

Figure 9:
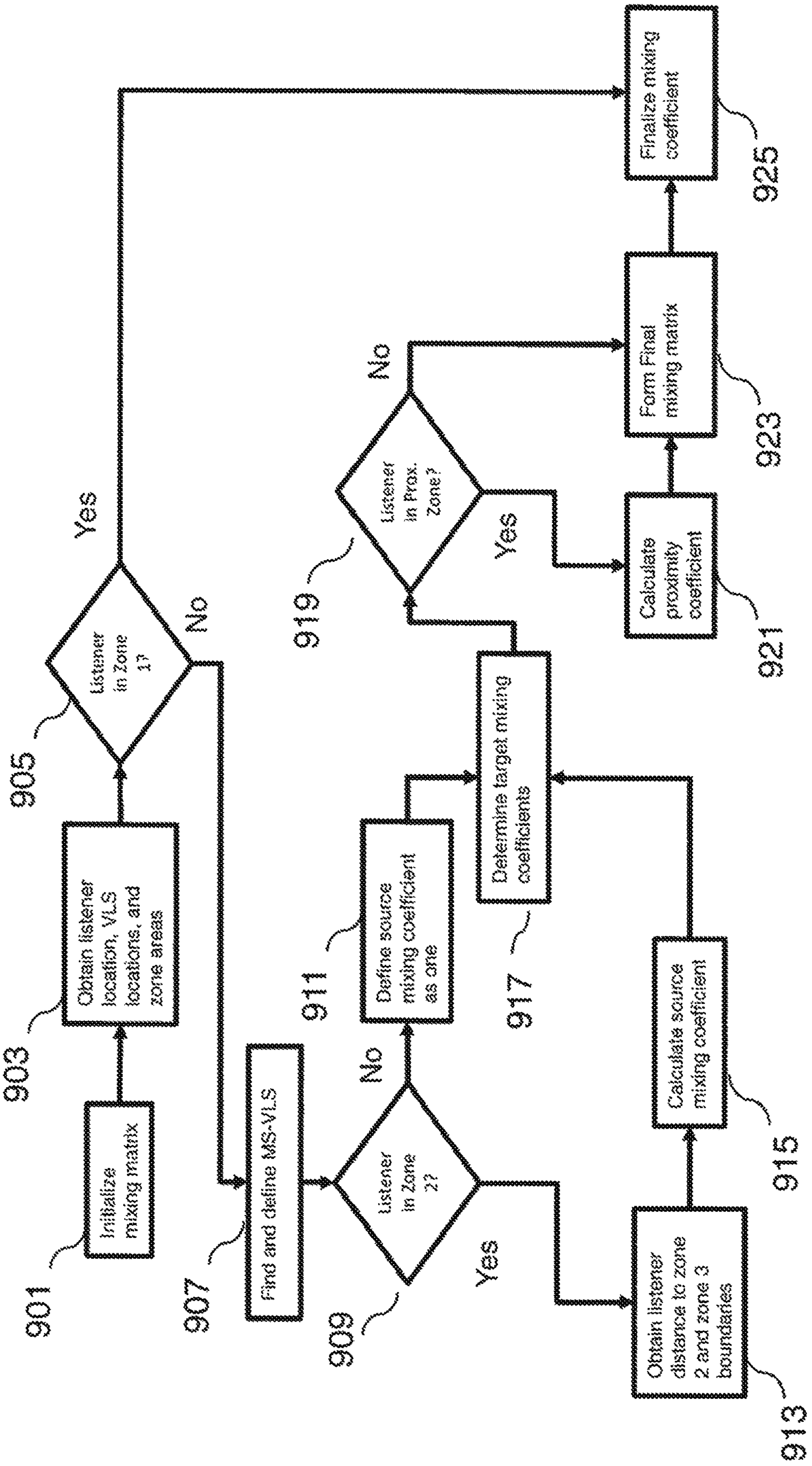
FIG. 9 shows a flow diagram of a further operation of the example system as shown in FIG. 1 according to some embodiments.

With respect to FIG. 9 is shown a flow diagram of the operations which may be followed to implement an example spatiality embodiment.

First, a mixing matrix M is defined. In this example 5 VLS channels are defined (as shown in figures) and the mixing matrix can be defined as a 5-by-5 matrix with gains defining how the original signals of each VLS $s_{in}(n)$ are mixed into modified VLS signals $s_{out}(m)$ that are used for final reproduction.

The mixing matrix may thus be defined as:

$$M = \begin{bmatrix} g_{11} & g_{12} & g_{13} & g_{14} & g_{15} \\ g_{21} & g_{22} & g_{23} & g_{24} & g_{25} \\ g_{31} & g_{32} & g_{33} & g_{34} & g_{35} \\ g_{41} & g_{42} & g_{43} & g_{44} & g_{45} \\ g_{51} & g_{52} & g_{53} & g_{54} & g_{55} \end{bmatrix}.$$

In some embodiments the renderer is configured to initialize this mixing matrix to an identity matrix, i.e., $$M = I = \begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}.$$

This means that every input and output signals of each VLS are exactly the same. The initialization of the mixing matrix is shown in FIG. 9 by step 901.

The next operation is to obtain the listener or user location, the VLS locations, and the zone areas in the sound scene (virtual space). This can be performed in any suitable manner as is shown in FIG. 9 by step 903.

The next operation is to check if the listener is in the Zone 1. This can be performed using any suitable method. This check is shown in FIG. 9 by step 705.

Where the check determines that the listener or user is in Zone 1 then no modifications are performed, and the mixing matrix is left as is and output or applied to the input VLS channel audio signals to generate the output VLS channel audio signals as shown in FIG. 9 by step 925.

When the check determines that the listener is not in the zone 1 then the next operation is to find one or more VLS channels closest to the user or listener and define these as mixing source VLS (MS-VLS). The number of VLS channels to select may be one to three but any number less than the total number of VLS may be selected. In some embodiments, all the loudspeakers that are closer to the listener than the average distance from all VLS to centre point of the VLS set multiplied by some constant are selected. This could be represented as equation $d_{list} < d_{center}\gamma$, where, for example, $\gamma = 0.8$.

The determination of/finding (and defining) the mixing source VLS is shown in FIG. 9 by step 907.

Having defined the mixing source VLS, the method may furthermore perform a further check to determine whether the listener is in zone 2 or zone 3. This can again be implemented by any suitable method (for example any suitable VR system location check). The check whether the listener is in zone 2 or 3 is shown in FIG. 9 by step 909.

When the check determines that the listener is in zone 3 (or not in zone 2 in the check) then the method may then generate a source mixing coefficient $\sigma$ (for energy). This value is equal for each MS-VLS and signifies how much of the energy is removed from each MS-VLS, which when the listener is in zone 3, $\sigma = 1$. This is shown in FIG. 9 by step 911.

When the check determines that the listener is in zone 2 then a listener distance to zone 1 & 2 and zone 2 & 3 borders (this may be the shortest distance) is determined as shown in FIG. 9 by step 913. Having determined the distances from the listener to the closest zone borders then the source mixing coefficient can be determined as:

$$\sigma = \frac{d_{z12}}{d_{z12} + d_{z23}}$$

Here $d_{z12}$ and $d_{z23}$ are the distances to zone 1 & 2 border and zone 2 & 3 border correspondingly. This means that there is no effect when the listener is at the zone 1 & 2 border and there is a maximum effect when the listener is at the zone 2 & 3 border and change is smoothed within zone 2. This determination is shown in FIG. 9 by step 915.

Having determined the source mixing coefficients (when the listener is in zone 2 or zone 3) the next operation is determining the target mixing coefficients for these VLS $\tau$. In some embodiments the mixing coefficients are generated to mix all energy equally to MT-VLS and as such, $$\tau = \frac{1}{N_{MT-VLS}},$$

where $N_{MT-VLS}$ is the number of MT-VLS. The determination of the target mixing coefficients is shown in FIG. 9 by step 917.

The method may then perform a further check to determine whether the listener is within one of the proximity zones surrounding any of the VLS. This can be again be implemented according to any suitable method and is shown in FIG. 9 by step 919.

If it is determined that the listener is in a proximity zone, then a proximity coefficient $\rho$ is calculated. For example the coefficient can be calculated as follows:

$$\rho = \max(0, \min(1, c[d_{pz} - d_{PVLS}]))$$

Here $d_{pz}$ is the proximity zone radius from the VLS and $d_{PVLS}$ is listener's distance from the VLS in the proximity zone. c is an effect multiplier constant and affects how quickly the proximity effect is applied. A typical value for the effect multiplier constant may be 2. The determination of the proximity coefficient is shown in FIG. 9 by step 921.

After determining the proximity coefficient or when the listener is not within a proximity zone radius then a modified mixing matrix can be formed. In some embodiments this can be done by taking a square root of each term as the coefficients are formed for energy but coefficients for amplitude are required. In some embodiments although the full matrix is complex it can be simplified in many cases.

For example an example matrix is shown where the listener is in zone 2, VLS 1 and 2 are the MT-VLS, and the listener is in proximity of VLS 1.

$$M = \begin{bmatrix} \sqrt{(1-\sigma)(1-\rho)} & 0 & 0 & 0 & 0 \\ 0 & \sqrt{1-\sigma} & 0 & 0 & 0 \\ \sqrt{\frac{\rho}{N_{MT-VLS}} + \sigma\tau(1-\rho)} & \sqrt{\sigma\tau} & 1 & 0 & 0 \\ \sqrt{\frac{\rho}{N_{MT-VLS}} + \sigma\tau(1-\rho)} & \sqrt{\sigma\tau} & 0 & 1 & 0 \\ \sqrt{\frac{\rho}{N_{MT-VLS}} + \sigma\tau(1-\rho)} & \sqrt{\sigma\tau} & 0 & 0 & 1 \end{bmatrix}$$

Each of the matrix elements is constructed with the following rules:

1. If m=n
   a. For proximity speaker, $g_{mn}=\sqrt{(1-\sigma)(1-\rho)}$
   b. For other MS-VLS, $g_{mn}=\sqrt{1-\sigma}$
   c. For MT-VLS, $g_{mn}=1$
2. Else if m≠n and n∈MS-VLS, m∈MT-VLS
   a. If n is proximity speaker, then $g_{mn}=\sqrt{\rho+\sigma\tau(1-\rho)}$
   b. Else $g_{mn}=\sqrt{\sigma\tau}$
3. Else, $g_{mn}=0$ Each of these gain terms have the square root term included as the formulated coefficients are for mixing energy and the gain coefficients are obtained by taking a square root.

As the listener may move in the virtual space and is likely to perform movement the distribution of VLS to MT-VLS and MS-VLS is likely to change. Thus in some embodiments there may be implemented a graceful transfer between mixing matrices. In some embodiments an intermediate mixing status is created where more VLS are included in one group (MT-VLS in some embodiments such as shown for methods as shown with respect to FIG. 7 and MS-VLS such as shown for methods as shown with respect to FIG. 9) than normally. This can be implemented as a generation of a union of the two sets of VLS to form an interim VLS set. To perform the change between two matrices smoothly, interpolation between corresponding matrix elements can furthermore be performed in some embodiments.

In some embodiments metadata can be used to indicate the type of zonal processing, and any zonal processing configuration parameters to be applied to different loudspeaker setups. In some embodiments metadata can be associated to each virtual loudspeaker set in the virtual scene, or a common metadata set can be associated with the whole sound scene. The metadata thus may be used to indicate the artistic intent about the zonal processing configured to modify the reproduction for virtual loudspeakers.

In some embodiments the zonal processing can also be implemented purely based on simple distance measures. In such embodiments a centre point of the VLS setup is determined (which can be generated by calculating a mean of all VLS locations within the sound scene). Then during the zonal processing the distance from this centre point to the listener or user is determined. In addition, in these embodiments the distance between each VLS and the listener or user is obtained to determine whether the listener or user is near any VLS. The zonal processing may then be implemented as follows:

zone 1 may extend from center point to the defined distance between the centre point to the closest VLS (for example 70% of the distance from the centre point to the nearest VLS).

zone 2 may extends from the outer limit of zone 1 to a further defined distance based on the distance between the centre point to the furthest VLS (for example 110% of the distance from the centre point to the furthest VLS).

zone 3 may extend from the outer limit of zone 2 (and to infinity or the end of the sound scene).

In zonal processing such as described with respect to the example method shown in FIG. 7, when moving audio signal content to the nearest VLS, it is also possible to obtain the original channel audio signal or any other better (e.g., object audio) audio signal content for the VLS channel. This audio signal can then be mixed into the nearest VLS instead of the mixture of all other channel signals.

Figure 10:
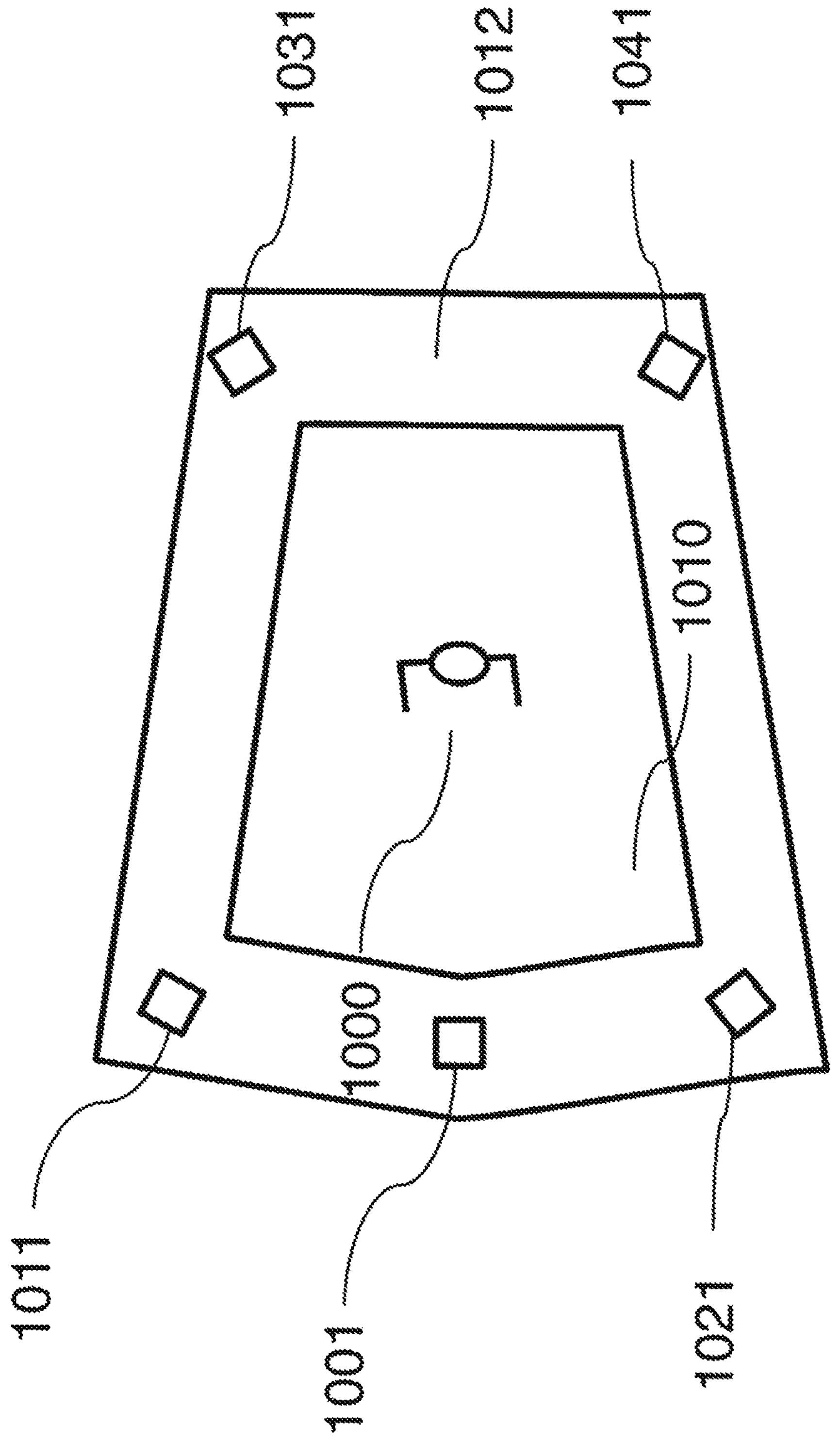
FIG. 10 shows schematically alternative shape configuration for the example system as shown in FIG. 1 according to some embodiments.

As described previously the zones may be any suitable shape (or volume where the sound scene is 3D). FIG. 10 shows a further example shape for the zones where there is a front centre speaker 1001, a front left speaker 1021, a front right speaker 1011, a rear left speaker 1041 and rear right speaker 1031. These are located at expected positions relative to the user or listener 1000. Additionally is shown the non regular polygon zone 1 (the innermost zone) 1010 and the non-regular polygon intermediate zone, zone 2 1012, which surrounds the innermost zone, zone 1 1010. In these examples the zones are defined or generated based on the geometry of the loudspeaker arrangement or setup. It is further understood that the loudspeaker/channel zone need not be circular in shape. Furthermore in some embodiments different loudspeakers/channels can have zones that are the different shapes or size. For example in some embodiments only N channels in a certain configuration have an proximity or individual zone.

In some embodiments content can be streamed by default to a user as VLS representation. The streaming server for example can also have unencoded versions of the channel signals. The default streamed representation thus reduces bit rate. However, when bit rate is available for at least one additional object, it can be advantageous at least in some use cases to transmit at least one of the channel signals as a separate object channel. In this case, starting in zone 2, the renderer can (when a separate channel object is received) gradually begin to lower the level of the VLS channel-based coding input to a speaker position and to increase accordingly the corresponding object channel. Thus, in this case, the playback of the channel is maintained, however the listener or user is presented with the correct original audio instead of a jointly encoded audio.

In some embodiments the methods as described herein can be applied to real-world listening of parametric spatial audio. As parametric spatial audio is intended to be listened to in the sweet spot area, there may be audible processing artifacts when only a single loudspeaker channel is listened to. When the listener or user is in the expected sweet spot area then these artifacts would not be audible as human hearing combines all the loudspeaker signals together to form the complete sound scene. However when the listener approaches a single loudspeaker, these artifacts become audible. In the embodiments as discussed herein and using a suitable position tracking system (indoor positioning in any form, GPS, etc.), it is possible to apply similar channel signal modifications as described above to achieve the same benefits, i.e., making it impossible to hear the artifacts.

In some embodiments, this method can also be applied in situations where the content is provided for a different loudspeaker layout than is used for the rendering of the audio signals. For example, the virtual loudspeaker layout in the VR space may be a 5.1 channel format but the content may be provided as a 7.1 channel format. In some embodiments the input content may be first transcoded from the input format to the output format (e.g., 7.1 to 5.1) and then the zonal processing as discussed herein applied. In some embodiments a transcoding matrix (for converting between input to output formats) is combined with the mixing matrix as discussed above in such a manner that only a single matrix is applied to the input audio signals (the at least two audio signals) to generate the output audio signals.

In some embodiments the zonal processing operations can be applied to more than one user listening to the same set of loudspeakers. In such embodiments an example implementation may be:

If all the users are closer to each other than a predetermined threshold distance (for example 0.3 times the loudspeaker circle radius), the zonal processing applies the modification or processing, but with the modification or processing that the mixing target loudspeakers are selected as the speakers closest to both of the users. For example, the system can determine the midpoint between the users and locate the speakers closest to the midpoint of the users. This may therefore ensure that all the users or listeners benefit from the modification.

If the users are sufficiently far away from each other (for example a distance of 0.5 times the loudspeaker circle radius), and no listener is substantially at the sweet spot or zone (for example within 0.2 times the speaker circle radius of the sweet spot) then the zonal processing method is performed for each listener individually. In such embodiments a set of mixing target speakers is selected for each listener individually. The result of implementing such embodiments is that if the listeners are sufficiently far away from each other and no-one is at the sweet spot then the personalized processing or modifications applied to the audio signal content is not distracting to other users or listeners.

If the above conditions are not met, then no processing or modifications are performed.

In implementing these embodiments the listener or user may therefore perceive the "full" channel format signal instead of a single component of the signal.

Figure 11:
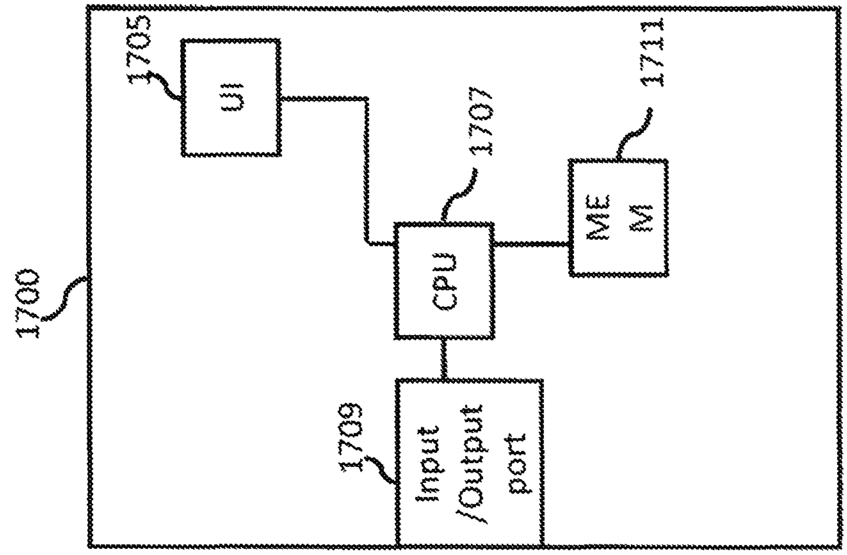
FIG. 11 shows an example device suitable for implementing the apparatus shown.

With respect to FIG. 11 an example electronic device which may be used as the analysis or synthesis device is shown. The device may be any suitable electronics device or apparatus. For example in some embodiments the device 1700 is a mobile device, user equipment, tablet computer, computer, audio playback apparatus, etc.

In some embodiments the device 1700 comprises at least one processor or central processing unit 1707. The processor 1707 can be configured to execute various program codes such as the methods such as described herein.

In some embodiments the device 1700 comprises a memory 1711. In some embodiments the at least one processor 1707 is coupled to the memory 1711. The memory 1711 can be any suitable storage means. In some embodiments the memory 1711 comprises a program code section for storing program codes implementable upon the processor 1707. Furthermore in some embodiments the memory 1711 can further comprise a stored data section for storing data, for example data that has been processed or to be processed in accordance with the embodiments as described herein. The implemented program code stored within the program code section and the data stored within the stored data section can be retrieved by the processor 1707 whenever needed via the memory-processor coupling.

In some embodiments the device 1700 comprises a user interface 1705. The user interface 1705 can be coupled in some embodiments to the processor 1707. In some embodiments the processor 1707 can control the operation of the user interface 1705 and receive inputs from the user interface 1705. In some embodiments the user interface 1705 can enable a user to input commands to the device 1700, for example via a keypad. In some embodiments the user interface 1705 can enable the user to obtain information from the device 1700. For example the user interface 1705 may comprise a display configured to display information from the device 1700 to the user. The user interface 1705 can in some embodiments comprise a touch screen or touch interface capable of both enabling information to be entered to the device 1700 and further displaying information to the user of the device 1700. In some embodiments the user interface 1705 may be the user interface for communicating with the position determiner as described herein.

In some embodiments the device 1700 comprises an input/output port 1709. The input/output port 1709 in some embodiments comprises a transceiver. The transceiver in such embodiments can be coupled to the processor 1707 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1709 may be configured to receive the signals and in some embodiments determine the parameters as described herein by using the processor 1707 executing suitable code. Furthermore the device may generate a suitable transport signal and parameter output to be transmitted to the synthesis device.

In some embodiments the device 1700 may be employed as at least part of the synthesis device. As such the input/output port 1709 may be configured to receive the transport signals and in some embodiments the parameters determined at the capture device or processing device as described herein, and generate a suitable audio signal format output by using the processor 1707 executing suitable code. The input/output port 1709 may be coupled to any suitable audio output for example to a multichannel speaker system and/or headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one non-transitory memory storing instructions that, when executed by the least one processor, cause the apparatus at least to:

obtain at least two audio signals for reproduction, wherein respective ones of the at least two audio signals are associated with respective ones of at least two reproduction locations within an audio reproduction space;

obtain within the audio reproduction space at least two zones;

obtain at least one location for a user's position within the audio reproduction space;

determine at least one of the at least two zones in which the at least one location is located;

determine at least one nearest reproduction location, of the at least two reproduction locations, to the at least one location; and process the at least two audio signals based, at least partially, on the at least one determined zone and the at least one nearest reproduction location to generate at least one output audio signal, where the at least one output audio signal is configured to be reproduced from at least one of the at least two reproduction locations.

2. The apparatus as claimed in claim 1, wherein the at least one output audio signal is configured to be reproduced from the at least one nearest reproduction location, wherein the at least one memory stores instructions that, when executed by the least one processor, cause the apparatus to:

provide the at least one output audio signal to at least one output device at the at least one of the at least two reproduction locations.

3. The apparatus as claimed in claim 2, wherein the at least one output device comprises at least one of:

a loudspeaker, wherein the at least one output audio signal comprises at least one loudspeaker channel audio signal; or a virtual loudspeaker, wherein the at least one output audio signal comprises at least one rendered virtual loudspeaker channel audio signal.

4. The apparatus as claimed in claim 1, wherein obtaining the at least two audio signals comprises the at least one memory storing instructions that, when executed by the least one processor, cause the apparatus to at least one of:

obtain premixed channel-based audio signal content for playback through at least two loudspeakers;

obtain ambisonic audio signals pre-rendered for playback through the at least two loudspeakers;

obtain a metadata-assisted spatial audio signal pre-rendered for playback through the at least two loudspeakers; or obtain audio object audio signals.

5. The apparatus as claimed in claim 1, wherein obtaining the at least two zones comprises the at least one memory storing instructions that, when executed by the least one processor, cause the apparatus to at least one of:

receive metadata associated with the at least two audio signals, the metadata configured to define regions or volumes of the at least two zones within the audio reproduction space;

receive metadata associated with the at least two audio signals, the metadata configured to define the at least two reproduction locations within the audio reproduction space, wherein regions or volumes of the at least two zones are defined based on the at least two reproduction locations; or receive metadata associated with the audio reproduction space, the metadata configured to define a perimeter of the audio reproduction space, wherein regions or volumes of the at least two zones are defined based on the perimeter of the audio reproduction space.

6. The apparatus as claimed in claim 1, wherein the at least two zones comprise:

a first, inner, zone;

a second, intermediate, zone extending from the first zone; and a third, outer, zone extending from the second zone.

7. The apparatus as claimed in claim 6, wherein the at least one memory stores instructions that, when executed by the least one processor, cause the apparatus to:

receive metadata associated with the at least two audio signals, the metadata configured to define the at least two reproduction locations, regions or volumes of the at least two zones;

define the first, inner, zone based on a mean location of the at least two reproduction locations and a radius defined by a product of a first zone distance adjustment parameter and a distance between a reproduction location of a channel nearest to the mean location and the mean location;

define the second, intermediate, zone extending from the first zone, the second zone extending to a further radius defined by a product of a second zone distance adjustment parameter and a distance between a reproduction location of a channel farthest from the mean location and the mean location; and define the third, outer, zone extending from the second zone.

8. The apparatus as claimed in claim 6, wherein the at least one memory stores instructions that, when executed by the least one processor, cause the apparatus to:

pass at least one of the at least two audio signals unmodified when the at least one location is within the first zone.

9. The apparatus as claimed in claim 8, wherein the at least one memory stores instructions that, when executed by the least one processor, cause the apparatus to:

transfer at least part of an audio signal associated with one or more reproduction locations to one or more further audio signals associated with one or more further reproduction locations, wherein the one or more reproduction locations is one of:

furthest from the at least one location, or nearest the at least one location, and wherein the one or more further reproduction location is one of:

nearest the least one location; or furthest from the at least one location, when the at least one location is within the second zone.

10. The apparatus as claimed in claim 9, wherein at least part of an audio signal associated with the one or more reproduction locations is based on distances between the at least one location and a nearest boundary between the first and second zones and a nearest boundary between the second and third zones.

11. The apparatus as claimed in claim 8, wherein the at least one memory stores instructions that, when executed by the least one processor, cause the apparatus to:

transfer at least part of an audio signal associated with one or more reproduction locations to at least one audio signal associated with one of more further reproduction locations, wherein the one or more reproduction locations is one of:

one or more reproduction locations furthest from the at least one location, or one or more reproduction locations nearest the at least one location, and wherein the one or more further reproduction locations is respectively one of:

one or more reproduction locations nearest the at least one location, or one or more reproduction locations furthest from the at least one location, when the at least one location is within the second zone and furthermore distance attenuated when the at least one location is within the third zone.

12. The apparatus as claimed in claim 6, wherein the at least two zones comprise at least one proximity zone, the at least one proximity zone being located at one of the at least two reproduction locations, wherein processing the at least two audio signals comprises the at least one memory storing instructions that, when executed by the at least one processor, cause the apparatus to:

when the at least one location is within one of the at least one proximity zone, transfer to an audio signal associated with the at least one nearest reproduction location at least part of an audio signal associated with one or more reproduction locations other than the at least one nearest reproduction location.

13. The apparatus as claimed in claim 6, wherein the at least two zones comprise at least one proximity zone, the at least one proximity zone being located at one of the at least two reproduction locations wherein processing the at least two audio signals comprises the at least one memory storing instructions that, when executed by the at least one processor, cause the apparatus to:

when the at least one location is within one of the at least one proximity zone, transfer at least part of an audio signal associated with the at least one nearest reproduction location to at least one or more audio signals associated with a reproduction location other than the at least one nearest reproduction location.

14. The apparatus as claimed in claim 1, wherein the audio reproduction space at least comprises one of:

a virtual loudspeaker configuration; or a real loudspeaker configuration.

15. A method comprising:

obtaining at least two audio signals for reproduction, wherein respective ones of the at least two audio signals are associated with respective ones of at least two reproduction locations within an audio reproduction space;

obtaining within the audio reproduction space at least two zones;

obtaining at least one location for a user's position within the audio reproduction space;

determining at least one of the at least two zones in which the at least one location is located;

determining at least one nearest reproduction location, of the at least two reproduction locations, to the at least one location; and processing the at least two audio signals based, at least partially, on the at least one determined zone and the at least one nearest reproduction location to generate at least one output audio signal, the at least one output audio signal is configured to be reproduced from at least one of the at least two reproduction locations.

16. The method as claimed in claim 15, further comprising providing the at least one output audio signal to at least one output device at the at least one of the at least two reproduction locations, and wherein the at least one output device comprises at least one of:

a loudspeaker, wherein the at least one output audio signal comprises at least one loudspeaker channel audio signal; or a virtual loudspeaker, wherein the at least one output audio signal comprises at least one rendered virtual loudspeaker channel audio signal.

17. The method as claimed in claim 15, wherein obtaining the at least two audio signals comprising at least one of:

obtaining premixed channel-based audio signal content for playback through at least two loudspeakers;

obtaining ambisonic audio signals pre-rendered for playback through the at least two loudspeakers;

obtaining a metadata-assisted spatial audio signal pre-rendered for playback through the at least two loudspeakers; or obtaining audio object audio signals.

18. The method as claimed in claim 15, wherein obtaining within the audio reproduction space the at least two zones comprises at least one of:

receiving metadata associated with the at least two audio signals, the metadata configured to define regions or volumes of the at least two zones within the audio reproduction space;

receiving metadata associated with the at least two audio signals, the metadata configured to define the at least two reproduction locations within the audio reproduction space, wherein regions or volumes of the at least two zones are defined based on the at least two reproduction locations; or receiving metadata associated with the audio reproduction space, the metadata configured to define a perimeter of the audio reproduction space, wherein regions or volumes of the at least two zones are defined based on the perimeter of the audio reproduction space.

19. The method as claimed in claim 15, wherein the at least two zones comprise:

a first, inner, zone;

a second, intermediate, zone extending from the first zone; and a third, outer, zone extending from the second zone.

20. The method as claimed in claim 19, further comprising receiving metadata associated with the at least two audio signals, the metadata configured to define the at least two reproduction locations, wherein regions or volumes of the at least two zones are defined based on the reproduction locations for:

defining the first, inner, zone based on a mean location of the at least two reproduction locations and a radius defined by a product of a first zone distance adjustment parameter and a distance between a reproduction location of a channel nearest to the mean location and the mean location; and defining the second, intermediate, zone extending from the first zone, the second zone extending to a further radius defined by a product of a second zone distance adjustment parameter and a distance between a reproduction location of a channel farthest from the mean location and the mean location; and defining the third, outer, zone extending from the second zone.

21. A non-transitory computer-readable medium comprising program instructions stored thereon for performing operations, the operations comprising, at least, the method as claimed in claim 15.

* * * * *